United States Patent
Zawaski et al.

(10) Patent No.: US 11,534,970 B2
(45) Date of Patent: Dec. 27, 2022

(54) HIGH TEMPERATURE 3D PRINTING VIA INVERTED HEATED BUILD CHAMBER

(71) Applicants: Callie Zawaski, Blacksburg, VA (US); Christopher Williams, Blacksburg, VA (US)

(72) Inventors: Callie Zawaski, Blacksburg, VA (US); Christopher Williams, Blacksburg, VA (US)

(73) Assignee: Virginia Polytechnic Institute and State University, Blacksburg, VA (US)

( * ) Notice: Subject to any disclaimer, the term of this patent is extended or adjusted under 35 U.S.C. 154(b) by 407 days.

(21) Appl. No.: 16/538,779

(22) Filed: Aug. 12, 2019

(65) Prior Publication Data

US 2020/0047412 A1 Feb. 13, 2020

Related U.S. Application Data

(60) Provisional application No. 62/832,530, filed on Apr. 11, 2019, provisional application No. 62/717,844, filed on Aug. 12, 2018.

(51) Int. Cl.

| | | |
|---|---|---|
| *B29C 64/25* | (2017.01) | |
| *B33Y 10/00* | (2015.01) | |
| *B33Y 30/00* | (2015.01) | |
| *B33Y 40/00* | (2020.01) | |
| *B29C 64/118* | (2017.01) | |
| *B29C 64/364* | (2017.01) | |
| *B29C 64/232* | (2017.01) | |
| *B29C 64/236* | (2017.01) | |
| *B29C 64/245* | (2017.01) | |
| *B29C 64/295* | (2017.01) | |
| *B29C 64/209* | (2017.01) | |

(52) U.S. Cl.
CPC ........... *B29C 64/25* (2017.08); *B29C 64/118* (2017.08); *B29C 64/209* (2017.08); *B29C 64/232* (2017.08); *B29C 64/236* (2017.08); *B29C 64/245* (2017.08); *B29C 64/295* (2017.08); *B29C 64/364* (2017.08); *B33Y 10/00* (2014.12); *B33Y 30/00* (2014.12); *B33Y 40/00* (2014.12)

(58) Field of Classification Search
CPC ...................................................... B29C 64/25
See application file for complete search history.

(56) References Cited

U.S. PATENT DOCUMENTS

| 6,722,872 B1 | 4/2004 | Swanson et al. |
| 2016/0271880 A1 | 9/2016 | Bheda et al. |

OTHER PUBLICATIONS

RepRap, 2009, https://youtu.be/euC2KZO37_Q, at time 0:44 (Year: 2009).*
Tinkerine, 2016, https://www.youtube.com/watch?v=ZoBMZdibtVU, at time 0:58 (Year: 2016).*
O'Neal, 2015, https://3dprint.com/62797/3d-printing-upside-down/ (Year: 2015).*
Szykiedans, et al. "Selected mechanical properties of PETG 3-D prints," Procedia Engineering, vol. 177, pp. 455-461, 2017.

(Continued)

*Primary Examiner* — Timothy Kennedy
*Assistant Examiner* — Alexander A Wang
(74) *Attorney, Agent, or Firm* — Carin R. Miller, Esq.; Johnson, Marcou, Isaacs & Nix, LLC

(57) ABSTRACT

Described herein are 3D printers capable of printing high-performance materials and uses thereof.

20 Claims, 15 Drawing Sheets

(56) References Cited

OTHER PUBLICATIONS

Bates, et al. "3D printed polyurethane honeycombs for repeated tailored energy absorption," Materials & Design, vol. 112, pp. 172-183, Published: Dec. 15, 2016.
Goyanes, et al., "Fused-filament 3D printing (3DP) for fabrication of tablets," Int. J. Pharm., vol. 476, No. 1, pp. 88-92, 2014.
Hutmacher, et al., "Mechanical properties and cell cultural response of polycaprolactone scaffolds designed and fabricated via fused deposition modeling," J. Biomed. Mater. Res., vol. 55, No. 2, pp. 203-216, 2001.
Ning, et al., "Additive manufacturing of carbon fiber reinforced thermoplastic composites using fused deposition modeling," Compos. Part B Eng., vol. 80, pp. 369-378, Available online: Jun. 20, 2015.
Leigh, et al., "A Simple, Low-Cost Conductive Composite Material for 3D Printing of Electronic Sensors," PLoS One, vol. 7, No. 11, pp. 1-6, Published: Nov. 21, 2012.
Gonzalez-Gutierrez, et al.,"Additive manufacturing of metallic and ceramic components by the material extrusion of highly-filled polymers: A review and future perspectives," Materials (Basel)., vol. 11, No. 5, 2018.
Choi, et al., "Influence of Bed Temperature on Heat Shrinkage Shape Error in FDM Additive Manufacturing of the ABS-Engineering Plastic," pp. 186-192, Published: Oct. 20, 2016.
Yang, et al., "Influence of thermal processing conditions in 3D printing on the crystallinity and mechanical properties of PEEK material," J. Mater. Process. Technol., vol. 248, No. pp. 1-7, Available online: May 2, 2017.
Yan, et al., "Research on the bonding of material paths in melted extrusion modeling," Mater. Des., vol. 21, No. 2, pp. 93-99, 2000.
Turner, et al.,"A review of melt extrusion additive manufacturing processes: II. Materials, dimensional accuracy, and surface roughness," Rapid Prototyp. J., vol. 20, No. 3, pp. 192-204, Accepted: Mar. 13, 2013.
Duty, et al., "A viscoelastic model for evaluating extrusion-based print conditions," Solid Freeform Fabrication: Proceedings of the 28th Annual International Solid Freeform Fabrication Symposium—An Additive Manufacturing Conference., pp. 495-506, 2017.
Aon3D, "Aon3D AON-M2," aon3d Inc., Jul. 23, 2018, pp. 1-5. [Online]. Available: www.aon3d.com.
Apium, "Apium P220," Apium Additive Technologies GmbH, Jul. 1, 2018, pp. 1-5. [Online]. Available: apiumtec.com.
Intamsys, "Intamsys Peek 3D Printers," Intamsys Technology Co. Ltd., Aug. 6, 2018, [Online]. Available: www.intamsys.com.
Intamsys, "Intamsys Funmat HT," Intamsys Technology Co. Ltd., Apr. 21, 2022, pp. 1-4. [Online]. Available: www.intamsys.com.
Roboz, "Roboz One + 400," Web agency BRAINPULL, Feb. 2, 2018. [Online]. Available: www.roboze.com.
Rokit, "Rokit 3Dison AEP," www.3disonprinter.com. [Online]. Available: en.3disonprinter.com, May 7, 2018.
Stratusys, "Fortus 400mc," Stratasys Ltd., Aug. 9, 2013. [Online]. Available: www.stratasys.com.
Tractus3D, "Tractus3D T650P," Tractus3D, Jan. 15, 2018, pp. 1-19. [Online]. Available: tractus3d.com.
VeraShape VSHAPER Pro, "VSHAPER," VSHAPER, Aug. 13, 2017. [Online]. Available: vshaper.com.
J. M. Gardner, C. J. Stelter, E. A. Yashin, and E. J. Siochi, "High Temperature Thermoplastic Additive Manufacturing Using Low-Cost, Open-Source Hardware," No. NASA/TM-2016-219344, pp. 1-17, Oct. 2016.
Crockett, et al., "Fused Deposition Modeling in microgravity," Solid Free. Fabr. Proceedings, Aug. 1999, pp. 671-678, Aug. 1999.
Radar, et al., "ASTM D638: Standard Test Method for Tensile Properties of Plastics." ASTM International, West Conshohocken, PA, pp. 1-17, 2015.
Wulle, et al., "Workpiece and Machine Design in Additive Manufacturing for Multi-Axis Fused Deposition Modeling," Procedia CIRP, vol. 60, pp. 229-234, 2017.

\* cited by examiner

|     | a) Compatible | b) Protected | c) Removed |
|-----|---------------|--------------|------------|
| Pro | • Easy to implement<br>• Enclosed heated environment | • Easy to implement<br>• Allows for increased environment temperature | • Environment temperature not limited by components |
| Con | • Environment temperature is limited by electronic components | • Environment temperature is limited by components that cannot be protected<br>• New risk at failure | • More complex system required to insulate, and allow for movement, which results in heat loss |

FIG. 2

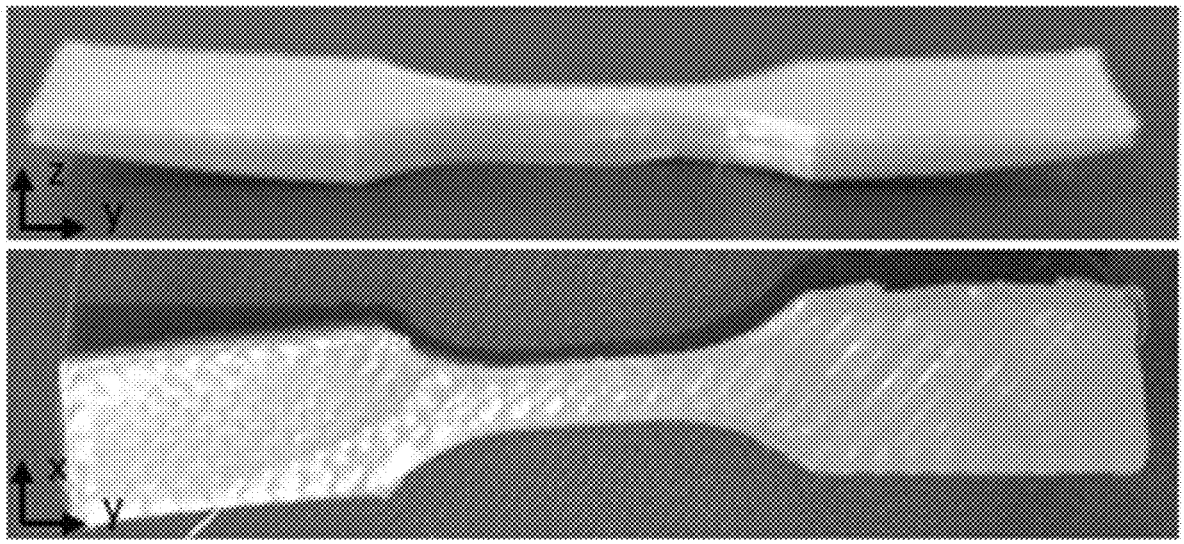
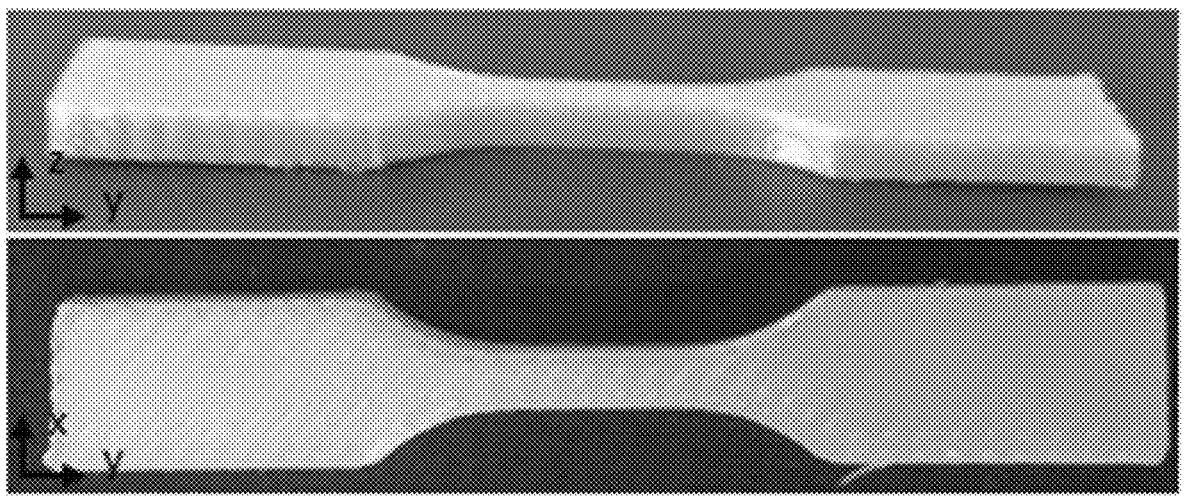
FIG. 9

HIGH TEMPERATURE 3D PRINTING VIA INVERTED HEATED BUILD CHAMBER

CROSS-REFERENCE TO RELATED APPLICATIONS

This application claims the benefit of and priority to U.S. Provisional Patent Application No. 62/717,844, filed on Aug. 12, 2018, entitled "HIGH TEMPERATURE 3D PRINTING VIA INVERTED HEATED BUILD CHAMBER," the contents of which is incorporated by reference herein in its entirety.

This application claims the benefit of and priority to U.S. Provisional Patent Application No. 62/832,530, filed on Apr. 11, 2019, entitled "HIGH TEMPERATURE 3D PRINTING VIA INVERTED HEATED BUILD CHAMBER," the contents of which is incorporated by reference herein in its entirety.

TECHNICAL FIELD

The subject matter disclosed herein is generally directed to 3D printers and 3D printing techniques.

BACKGROUND

Three-dimensional (3D) printing has revolutionized manufacturing. However, 3D printing is not suitable for use with all materials. As such there exists a need for improved 3D printing devices and techniques.

SUMMARY

Described herein are aspects of a three dimensional (3D) printer capable of printing at temperatures greater than 200° C. or greater including: an inverted build chamber that is open on the bottom including: an insulated heated print bed comprising a print surface, wherein the insulated heated print bed is inverted such that the print surface is oriented towards the open bottom of the inverted build chamber and wherein the insulated heated print bed forms the top wall of the inverted build chamber; one or more insulated side walls, wherein each of the insulated side walls is coupled to the insulated heated print bed and extend vertically away from the heated print bed, and wherein the one or more side walls are configured to enclose the heated print bed and are positioned such that the one or more side walls are perpendicular to the insulated heated print bed so as to form the inverted build chamber that is open on the bottom; a heater coupled to the inverted build chamber, wherein the heater is configured to heat insulated side walls to 200° C. or greater; a print head assembly comprising: an extruder configured to receive, heat, melt, and expel a filament, wherein the extruder comprises a nozzle through which a melted filament can be expelled, wherein the nozzle of the extruder is oriented upwards towards the print surface of the insulated heated print bead to expel and deposit the melted filament onto the print surface of the insulated heated print bed or onto a layer of material present on the print surface of the heated print bed; and a three-axis movement assembly coupled to the print head assembly, wherein the three axis assembly is configured to move the print head assembly is configured to maintain the print head assembly in a fixed position within the inverted build chamber or is configured to move the print head assembly in zero to three dimensions within the inverted build chamber and the build chamber is capable of moving in zero to three dimensions. In some aspects, the filament includes or is composed entirely of a high-performance material. In some aspects, the filament includes or is composed entirely of a polymer requiring a print environment temperature of greater than about 200° C. In some aspects, the filament includes or is composed entirely of a polymer selected from the group consisting of: PEEK, Ultem, and PPSF. In some aspects, the inverted build chamber can be a rectangular prism that can have a height, a length, and a width, wherein the height ranges from 12 inches to 36 inches, wherein the length ranges from 12 inches to 36 inches, and wherein the width ranges from 12 inches to 36 inches. In some aspects, the inverted build chamber can be a cylinder that can have a height and a diameter, wherein the height ranges from 12 inches to 36 inches and wherein the diameter ranges from 12 inches to 36 inches. In some aspects, the print arm assembly can be a delta configured printer assembly or a Cartesian configured printer assembly. In some aspects, the printer assembly includes one or more robotic arms that have 3 or more degrees of freedom. In some aspects, the printer assembly can be fixed and wherein the insulated heated print bed can be configured to move in 3 dimensions and rotate in one or more planes within the inverted build chamber. In some aspects, the inverted build chamber can be configured to generate a temperature gradient within the inverted build chamber during operation, wherein an environmental temperature of a print region at the print surface of the insulated heated print bed is maintained at about the temperature that the insulated sidewalls are heated to. In some aspects, the inverted build chamber can be configured to maintain the environmental temperature of the print region at the print surface of the insulated heated print bed at about 200° C. to about 500° C. In some aspects, the insulated side walls can be configured to be heated to at least 200, 205, 210, 215, 220, 225, 230, 235, 240, 245, 250, 255, 260, 265, 270, 275, 280, 285, 290, 295, 300, 305, 310, 315, 320, 330, 335, 340, 345, 350, 355, 360, 365, 370, 375, 380, 385, 390, 395, 400, 405, 410, 415, 420, 425, 430, 435, 440, 445, 450 to 500° C. or greater. In some aspects, the inverted build chamber can be configured to maintain the environmental temperature of the print region at the print surface of the insulated heated print bed at about 200, 205, 210, 215, 220, 225, 230, 235, 240, 245, 250, 255, 260, 265, 270, 275, 280, 285, 290, 295, 300, 305, 310, 315, 320, 330, 335, 340, 345, 350, 355, 360, 365, 370, 375, 380, 385, 390, 395, 400, 405, 410, 415, 420, 425, 430, 435, 440, 445, 450 to 500° C. or greater. In some aspects, the print region at the print surface extends to the z height of the print area minus 1 inch.

Also described herein are aspects of a method of fused filament fabrication, the method including: heating the insulated side walls of a 3D printer as in claim 1, to a temperature suitable for printing with a filament material contained within the extruder of the 3D printer; heating the print bed; heating one or more elements of the extruder to a temperature suitable for printing with a filament material contained within the extruder of the 3D printer; and printing a layer, the step of printing a layer comprising: melting a region of the filament material within the extruder; expelling the melted filament material through the nozzle of the extruder such that it is deposited on the print surface of the heated print bed or a layer already present on the print surface. In some aspects, the insulated side walls are heated to a temperature of about 200° C. to about 500° C. In some aspects, the filament material can be a high-performance material. In some aspects, the inverted build chamber is filled with a gas or gas mixture that is less dense than air at least during operation. In some aspects, the method further includes the step of annealing one or more layers of filament material deposited on the print surface. In some aspects, the step of annealing comprises controlling the cooling rate of one or more layers of filament material deposited on the print surface.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 2 shows three basic 3D printer design concepts of currently available printers for handling the components compatibility to enable printing in high temperature environments.

FIG. 9 shows images of printed tensile bars using the upside-down printer printed at 25° C. and 200° C. The tensile bars are 63.5 mm in length, 9.53 mm in width, and 3.17 mm in height.

DETAILED DESCRIPTION

Figure 1:
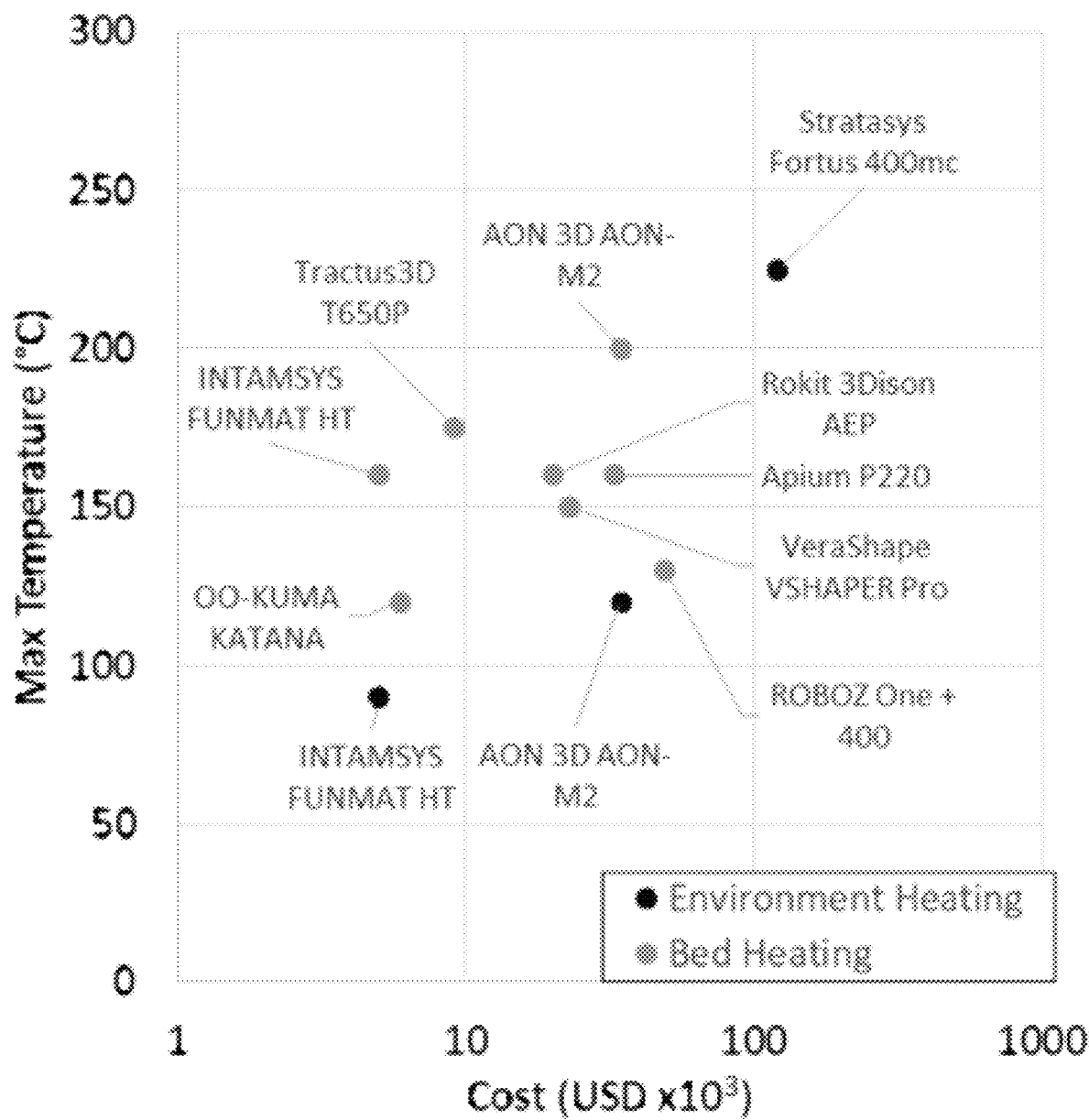
FIG. 1 shows a graph demonstrating the advertised maximum temperature for a heated bed and/or the build environment.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of chemistry, physics, mechanical engineering, engineering organic chemistry, polymer chemistry, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

The term "copolymer" as used herein, generally refers to a single polymeric material that is comprised of two or more different monomers. The copolymer can be of any form, such as random, block, graft, etc. The copolymers can have any end-group, including capped or acid end groups.

The term "molecular weight", as used herein, can generally refer to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

As used herein, "polymers" are understood to include, but are not limited to, homopolymers, copolymers, such as for example, block, graft, random and alternating copolymers, terpolymers, etc. and blends and modifications thereof.

Discussion

According to the 2018 Wohler's Report, fused filament fabrication (FFF), a type of material extrusion additive manufacturing (AM) technology, has the largest market install base of all AM systems. FFF has been used for the fabrication of both functional prototypes and end-use parts in industrial (e.g., automotive, aerospace, medical), educational, and hobbyist markets. The small size, and inexpensive desktop machines open the market to more users owning a 3D printer and democratizing manufacturing. The commodity thermoplastic material used in FFF creates accurate macro parts with robust mechanical properties that anyone can create because of its small scale and simple, inexpensive design.

The materials available for FFF have been expanding from ABS and PLA to include other materials such as Polyethylene Terephthalate Glycol (PETG) [1], thermoplastic polyurethane (TPU) [2], polyvinyl alcohol (PVA) [3], polycaprolactone (PCL) [4], and materials with fillers [5]-

[7]. However, high performance materials, including ULTEM, Polyether ether ketone (PEEK), and Polyphenylsulfone (PPSF or PPSU), are currently only printable on expensive, industrial systems. FFF of high-performance polymers requires higher nozzle temp (due to higher Tg and higher melt viscosity). They also require a high temp heated environment to reduce part curling [8], [9], and to increase strength (layer weld times, bonding potential, etc.) [10], [11]. Part curling is caused by the internal stresses that form within a part as the part cools [12], [13]. These stresses are produced by the thermal gradient within a deposited road. Curling occurs when a hot layer deposited on a cold layer begins to cool and shrink, forcing the cold layer below to either curl or delaminate when the internal stresses become too high. As such there exists a need for methods and devices capable of printing high-performance materials.

With that said, described herein are methods and device capable of 3D printing using high-performance materials. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Inverted High-Temperature Build Environment 3D Printer High temperature filament material extrusion is enabled via specialized machines that print parts in a high temperature environment. Recently, new systems have arrived in the market with the ability to print PEEK, Polyetherimide (PEI), Polyvinylidene fluoride (PVDF), Acetal Copolymer (POM-C), and Nylon (PA6,6, and PA6, 12). These high temperature machines require the use of metal parts over plastic parts and specialized components/ electronics in order to operate using high temperatures. These parts and components add to the total cost of the printer, limiting the ability for users to print high performance materials. FIG. 1 shows currently available 3D printers and their advertised maximum steady state temperatures and how the maximum temperature of the machine has a logarithmic relationship with the cost of the printer (Cherdo, "13 Professional PEEK 3D Printers (Also ULTEM®, PEI and High-Performance Materials)," Aniwaa Pte. Ltd, 2018. [Online]. Available: www.aniwaa.com; Aon3D, "Aon3D AON-M2," aon3d Inc., 2018. [Online]. Available: www.aon3d.co; Apium, "Apium P220," Apium Additive Technologies GmbH, 2018; INTAMSYS, "INTAMSYS Funmat HT," INTAMSYS TECHNOLOGY CO. LTD., 2017. [Online]. Available: www.intamsys.com; Oo-kuma, "Oo-kuma Katana." [Online]. Available: www.00-kuma.com; Roboz, "Roboz One+400," Web agency BRAINPULL, 2018. [Online]. Available: www.roboze.com; Rokit, "Rokit 3Dison AEP," www.3disonprinter.com. [Online]. Available: en.3disonprinter.com; Stratusys, "Fortus 400mc," Stratasys Ltd., 2018. [Online]. Available: www.stratasys.com; Tractus3D, "Tractus3D T650P," Tractus3D, 2018. [Online]. Available: tractus3d.com; and VeraShape VSHAPER Pro, "VSHAPER," VSHAPER, 2018. [Online]. Available: vshaper.com. With respect to the Stratasys Fortus 400mc, although the advertised maximum temperature is about 225° C., in use it may not actually achieve this maximum temperature under operational conditions.

Most of the high temperature machines use controlled bed heating (FIG. 1, Bed heating), where there is a controlled heating element on the bottom of the bed that relies on conduction through the part to prevent curling. The bed is limited to temperatures below the $T_g$ of the polymer, to prevent deformation of the parts bottom layers. This means that tall parts cannot gain all of the layer bonding benefits of the additional heating, because the top of the part is too far removed from the heat source, and complex shaped parts may have uneven heating/cooling throughout the part.

Other available machines use a heated build chamber controls the entire environment to a uniform elevated temperature. The print volume is enclosed and insulated providing steady temperature around the part. The steady uniform temperature allows the ability to bring the entire part closer to $T_g$ and can create creating stronger bonds between layers throughout the part with a higher bonding potential (Y. Yan, R. Zhang, G. Hong, and X. Yuan, "Research on the bonding of material paths in melted extrusion modeling," Mater. Des., vol. 21, no. 2, pp. 93-99, 2000), as well as decreasing the residual internal stresses.

Some high-performance materials require an ambient printing environment temperature of at least 200° C. to produce 3D printed parts with high mechanical properties (C. Yang, X. Tian, D. Li, Y. Cao, F. Zhao, and C. Shi, "Influence of thermal processing conditions in 3D printing on the crystallinity and mechanical properties of PEEK material," J. Mater. Process. Technol., vol. 248, no. May, pp. 1-7, 2017). Most of the available printers shown in FIG. 1 are incapable of such high temperatures and there is a logarithmic relationship between the temperature of the printer and the cost of purchasing that printer. This effectively limits the accessibility of printing with high performance polymers. The maximum temperature of the machine is limited by the component with the lowest operating temperature range. A higher temperature environment requires more specialized components that are capable of operating at these elevated temperatures. Each specialized component that is required increases the overall cost of the printer, resulting in the relationship between the cost and the maximum operating temperature.

FIG. 2 illustrates the design concepts that can be used for each printer component. A printer can utilize all of the embodiments described herein. A printer described herein can utilize all of these design features to handle high temperature printing. However, there are limitations of these designs which can prevent them from being able to sustain ambient printing temperatures required to print using high-performance materials (e.g. about 200° C. or greater). This can include the ability of electronic components to repeatedly function under such temperature stresses. Compatible components are defined as using only parts and electronics that are capable for operating in the high-temperature environment for sustained periods of time. A printer can be fully enclosed inside an insulated chamber to provide a heated environment for the part. This design is seen in many off the shelf printers such as the Afinia H800 (Afinia 3D). The Afinia is enclosed and uses heat from the print bed to heat the printed environment. However, the Afinia is not sold as a high temperature printer because the temperature of the environment is limited to the operating temperatures of all components inside the heated chamber. Incorporating higher temperature electronics does allow for increased temperatures, but at a higher price and the temperature of the environment is still limited by the new operating temperature range or other components operating temperature.

Some available 3D printers can apply a protected approach as shown in b) in FIG. 2. In a protected approach, components that are within the heated printing chamber are protected or shielded from the heat in a variety of manners.

Protected components can be defined by adding insulation and/or cooling to protect parts and electronics from the high temperature environment. This can have the advantage of expanding the operating range of components to be able to operate at a higher environment temperature. Designs for cooling the printer electronics have been generated (H. Bheda and R. Reese, "Fused Filament Fabrication using liquid cooling," US2016/0271880 A1, 2016). AON-M2 is one commercial machine that uses liquid cooled hot end and motion components to allow an increased environment chamber temperature (Aon3D, "Aon3D AON-M2," aon3d Inc., 2018. [Online]. Available: www.aon3d.com). A non-commercial design using protected components is documented, released by NASA, to modify an existing 3D printer (Lulzbot Taz 4). This modification includes adding an enclosure around the printer, active cooling for the motors, and heat lamps as well as switching parts to higher temperature plastics to reach higher environment temperatures (J. M. Gardner, C. J. Stelter, E. A. Yashin, and E. J. Siochi, "High Temperature Thermoplastic Additive Manufacturing Using Low-Cost, Open-Source Hardware," no. October 2016, 2016). Using heat lamps is a different way of protecting the electronics by focusing heat to the printing parts, creating inconsistent heating in the environment, thus the air around the part is hotter, where it is needed, than the air around the motors, where it is not needed. However, some components simply cannot be protected.

Protecting components can allow the printers to increase the environment temperature past the limitation of the protected motors and larger electronics. However, the build environment temperature is still limited by any belts, plastic parts, wire insulation, etc. that are more difficult to protect and must be replaced with compatible components. The other issue with protecting the components is that it creates a new mode of failure. If the protection fails, there could be damage to expensive components in the printer. As such, the printing environment temperature is limited to the threshold of those components. Currently, no available 3D printer employing this approach is able to sustain ambient printing temperatures required to print using high-performance materials (e.g. about 200° C. or greater) due at least to the temperature limitations of the unprotected components.

Finally, some current printers (e.g. the Stratasys Fortus 400mc) employ a removed approach as shown in c) of FIG. 2. In this approach, all components not required to be in the print chamber are removed so as not to be exposed to the high ambient temperature. Removed components refers to removing all of the parts and electronics from being inside, or in contact with the high temperature needed for the environment. A patent that uses this design concept is owned and used by Stratasys for their FFF systems (W. Swanson, P. Turley, P. Leavitt, P. Karwoski, J. LaBossiere, and R. Skubie, "High Temperaure Modeling Apparatus," U.S. Pat. No. 6,722,872 B1, 2004). The motors are outside of the actual heated chamber, using linear screw and belts to move the print stage and print head. This design concept has the advantage of isolating the components are required, meaning the environment is not limited by the component temperatures.

A limitation with this design approach is the tradeoff insulating the machine and allowing for movement of the print head. An example of this design implementation is the Stratasys Fortus 400 mc. Careful evaluation and testing of this printer has demonstrated that this approach has its issues. For example, the Stratasys Fortus 400mc machine uses a design where a plastic accordion is used to insulate the top of the chamber and allow movement of the print head in the build space. The accordion insulation is insufficient to prevent heat from escaping into the top of the machine which contains the print head components. Further and as shown in c) of FIG. 2, the print bed is still contained inside the heated print environment and is operated in a right-side-up manner in which the print head is located above the print bed. As such, the Stratasys Fortus 400 mn using this approach suffers from an inability to reach temperatures above 225° C. despite its advertisement to the contrary. This can be due to the loss of heat through the design required in the insulation of the build chamber to accommodate the top positioned print head and allow for its movement within the build chamber. Another disadvantage of this approach is that it is more costly to operate and requires a greater amount of energy input to keep the build chamber heated. Further, due to this approach, as heat rises and escapes the build chamber via concessions made to accommodate the top-positioned print head current "removed design", it can damage components that are outside the build chamber that are not able to withstand the high temperatures such as electronics and mechanisms that move the print head within the chamber. Although components can be designed that can withstand these temperatures, it is cost-prohibitive for most applications. Current systems that use this approach do not meet the temperatures needed for printing high performance materials. As such, there still exists a need for a 3D printer capable of sustained high ambient build environment temperatures that can be capable of printing using high performance materials.

In contrast to prior designs, the 3D printers described herein can be capable of printing high performance materials that are printed with ambient printing temperatures of about 200° C. or greater. Indeed, high performance materials can need these high ambient printing temperatures so that proper bonding of the material layers can occur. If proper bonding does not occur, this can result in mechanical failure of the 3D printed article. In some aspects, the 3D printers described herein can be desktop-scale and can be built at substantially a lower cost that other 3D printers. The 3D printers described herein can be configured to provide a constant high (greater than 200° C.) temperature environment.

Figure 3:
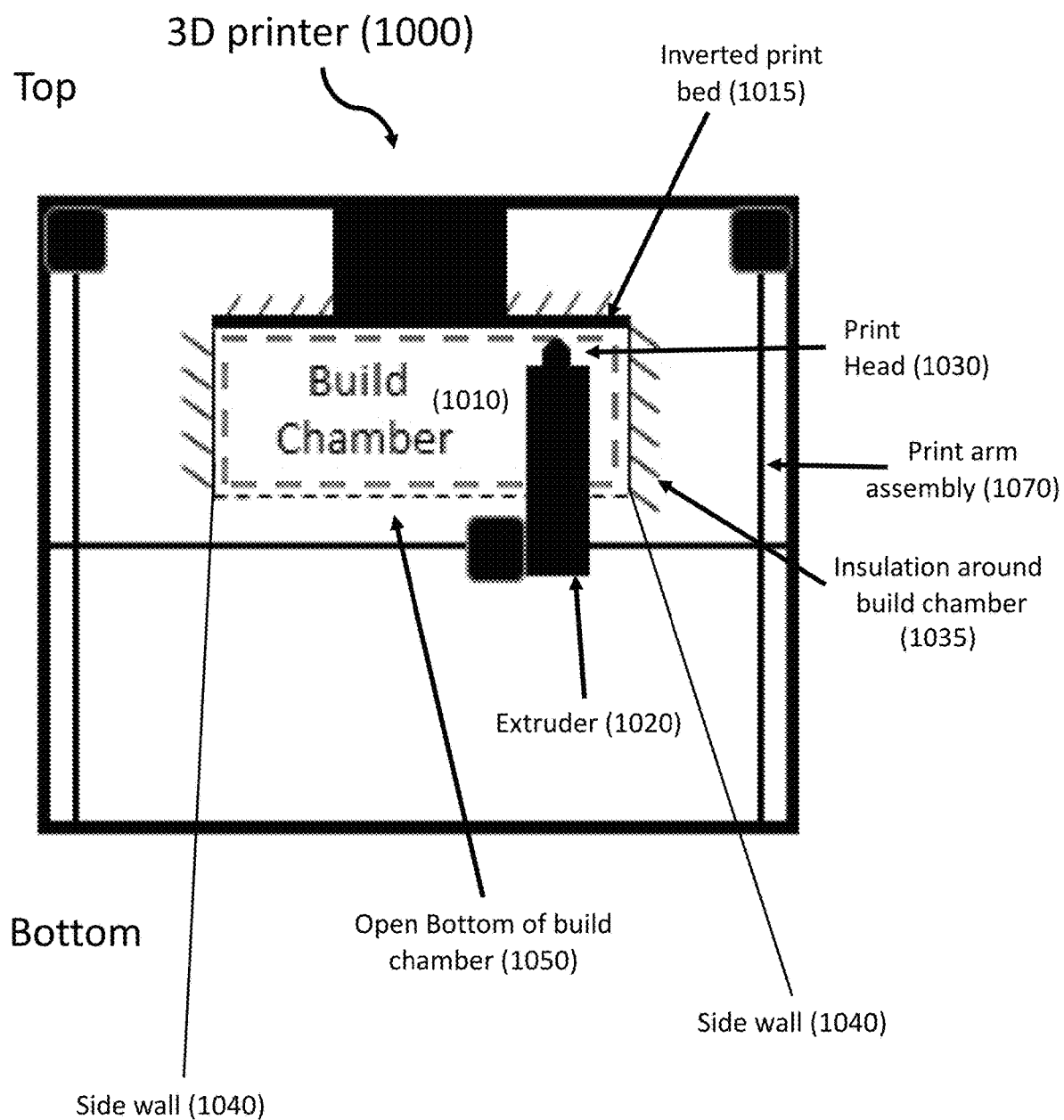
FIG. 3 shows a general design of a high environment temperature 3D printer system design as described herein, where the printer (e.g. the build chamber) is inverted to allow for an open bottom to the heated print area for the print head to be able to access without inhibiting movement.

The 3D printer described herein can be configured such that a minimum number or none of printing components are present in the heated build chamber. In this way the temperature of the printing environment is not limited to the operating temperature of the components. This can allow for the use, in some embodiments, of off the shelf room temperature operating components for the motion and control of the printer. This can translate to reducing and minimizing the cost of the printer while maximizing the print environment temperature. The 3D printers described herein can incorporate an inverted build chamber in combination with the removed component design approach, which can overcome the limitations of traditional 3D printers utilizing a removal design approach. Thus, as is described in greater detail below, the 3D printers described herein (see e.g., FIG. 3) can contain an inverted build chamber that can allow for an open bottom of the build chamber to the heated print area to allow for access to the heated print area via the print head without inhibiting movement and keeping heat away from components that are external to the build chamber but maintaining a high temperature print area.

As discussed above, described herein are embodiment of a three-dimensional (3D) printer 1000 capable of printing at temperatures greater than 200° C. or greater. It will be appreciated that the 3D printer 1000 described herein is also capable of operating at temperatures lower than 200° C. as desired. In some embodiments, the 3D printer 1000 described herein can be capable of printing at temperatures of 200° C. to about 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater.

In some embodiments, the 3D printer 1000 described herein can be capable of printing at temperatures of 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or 500° C.

The 3D printer 1000 described herein can include an inverted build chamber 1010 that is open on the bottom 1050. The inverted build chamber can include an insulated heated print bed 1015 having a print surface. A suitable insulation material 1035 can be used to insulate the heated print bed and/or inverted build chamber 1010. In some aspects, the suitable insulation material 1035 can be ultra-high temperature ceramic fiber insulation. Other approaches to insulate the inverted build chamber can include a vacuum chamber approach or a trapped air approach. The insulated heated print bed 1015 can be inverted such that the print surface is oriented towards the open bottom 1050 of the inverted build chamber 1010. The insulated heated print bed 1015 can thus form the top wall of the inverted build chamber 1010.

The inverted build chamber 1010 can also include four insulated side walls 1040. The inverted build chamber 1010 can be air tight or effectively air tight. Each of the insulated side walls 1040 can be coupled to the insulated heated print bed 1015 and can extend vertically away from the heated print bed 1015. Each of the insulated side walls 1040 can be attached to two other insulated side walls 1040 on the two sides of each insulated side wall 1040 that are perpendicular to the insulated heated print bed 1015 (and thus not attached to the heated print bed) so as to form the inverted build chamber 1010 that is open on the bottom 1050. It will be appreciated that the inverted build chamber 1010 is not limited to a particular shape but can be any shape as desired. For example, the inverted build chamber 1010 can be a cylinder, square, rectangular prism or any other desired 3D shape. In any case, the side wall(s) 1040 must be configured and coupled to each other and/or other relevant components such that they cover the entire 360° area around the print bed 1015. A suitable insulation material 1035 can be used to insulate the side wall(s). In some aspects, the suitable insulation material 1035 can be ultra-high temperature ceramic fiber insulation. Other approaches to insulate the side wall(s) 1040 can include a vacuum chamber approach or a trapped air approach.

The side wall(s) 1040 can be made out of any suitable material. Suitable heat conductive materials include those that conduct heat. Suitable heat conductive materials include, but are not limited to metals, mixed metal composites, and heat conducting polymers and polymer composites. In some aspects, the side wall(s) 1040 can be made out of aluminum. The side wall(s) 1040 can be insulated 1035.

In some aspects, the heated print bed 1015 can be made out of a suitable heat conductive material as well. Suitable heat conductive materials include those that conduct heat. Suitable heat conductive materials include, but are not limited to metals, mixed metal composites, and heat conducting polymers and polymer composites. In some aspects, the heated print bed can be made out of aluminum. As previously discussed, the heated print bed can be insulated. Suitable insulation materials and strategies are as previously discussed.

Embodiments of the 3D printer 1010 described herein can also include a heater that can be coupled to the inverted build chamber. In some embodiments, the heater is coupled to one or more of the insulated side walls 1040 and/or heated printer bed 1015. The heater can be configured to heat one or more of the insulated side walls 1040 to 200° C. or greater. In some embodiments, the heater can be capable of and/or configured to heat one or more of the insulated side walls 1040 to 200° C. to about 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater.

In some aspects, the heater can be capable of and/or heating one or more of the insulated side walls 1040 to 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

In some aspects, the heater can be capable of and/or heating one or more of the insulated side walls 1040 from about 25° C. to about 500° C. or greater. In some aspects, the heater can be capable of and/or configured to heat one or more of the insulated side walls 1040 from about 25° C. to about 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C. In some aspects, the heater can be capable of and/or configured to heat one or more of the insulated side walls 1040 to a temperature that is greater than the 3D printer's external environment temperature.

Embodiments of the 3D printer 1000 described herein can include a print head assembly 1060. The print head assembly 1060 can include an extruder 1020 that is configured to receive, heat, melt, and/or expel a filament. The extruder 1020 can include a nozzle through which a melted filament can be expelled. The nozzle of the extruder 1020 can be placed in the extruder 1020 and the extruder 1020 can be oriented within the 3D printer such that the nozzle points upwards towards the print surface of the insulated heated print bead 1015 such that it is capable of expelling and depositing the melted filament onto the print surface of the insulated heated print bed 1015 and/or onto a layer of material present on the print surface of the heated print bed 1015. The extruder 1020 can be made of one or more suitable materials. Suitable materials can be those that are compatible with the system. Suitable materials can include, but are not limited to, metals, metal composites, polymers, and/or ceramics. In some aspects, the extruder can be composed of aluminum, steel, brass, or any combination thereof. Suitable materials for components that can be located inside the inverted heated build chamber 1010 can have a melting temperature that is greater than or compatible with the environment inside the heated build chamber 1010.

The system can include one or more sensors to detect one or more characteristics of the build chamber 1010 or any other component or environment in or surrounding the 3D-printer described herein. For example, the 3D-printer described herein can include a temperature sensor inside the build chamber 1010. Temperature and other environmental condition sensors are generally known in the art. In some aspects, the temperature sensor or other sensor can be compatible with the environment inside the build chamber and is thus composed of material(s) that can withstand the high temperatures achieved and maintained in this environment. Such materials are discussed elsewhere herein.

The filament can be composed of any material suitable for 3D printing via fused filament fabrication. While the 3D printers 1000 described herein are capable of printing high-performance materials (those requiring a printing temperature of about 200° C. or greater), it will be appreciated that the 3D printers 1000 described herein are also capable of printing at temperatures less than 200° C. or greater and thus are not limited to only printing high-performance materials. The filament can be composed of a high-performance material. High-performance materials can be polymers and composites, metals (including elemental metals and non-elemental materials (e.g. metal oxides)), mixed metal materials (e.g. materials containing more than one type of metal) and combinations thereof. Example high-performance materials include, but are not limited to, PEEK, PPSE, and Ultem. In some embodiments, the filament is composed of a polymer requiring a print temperature of greater than about 200° C. In some embodiments, the filament can be composed of a polymer selected from the group of: PEEK, PPSE, and Ultem.

Embodiments of the 3D printer 1000 can include a print arm assembly 1070 coupled to the print head assembly 1060. The print arm assembly 1070 can be configured to move to maintain the print head assembly 1060 in a fixed position within the inverted build chamber or is configured to move the print head assembly 1060 in zero to three dimensions within the inverted build chamber 1010. In some embodiments, the print head assembly 1060 can be a delta configured (using polar coordinates) printer assembly. In some embodiments, the print head assembly 1060 motion can be a Cartesian configured print arm assembly. In some embodiments, the insulated heated print bead 1015 is configured to rotate and/or move during operation in zero to three dimensions. See e.g. FIGS. 12-14. In some embodiments, the print head and/or arm assembly 1060/1070 includes one or more robotic arms. In some embodiments, the print head assembly 1060 can be fixed in a position in space, such as within the inverted build chamber 1010, and the insulated heated print bed 1015 can be configured to move in zero to three dimensions and/or rotate in one or more planes within the inverted build chamber 1010.

Figure 12:
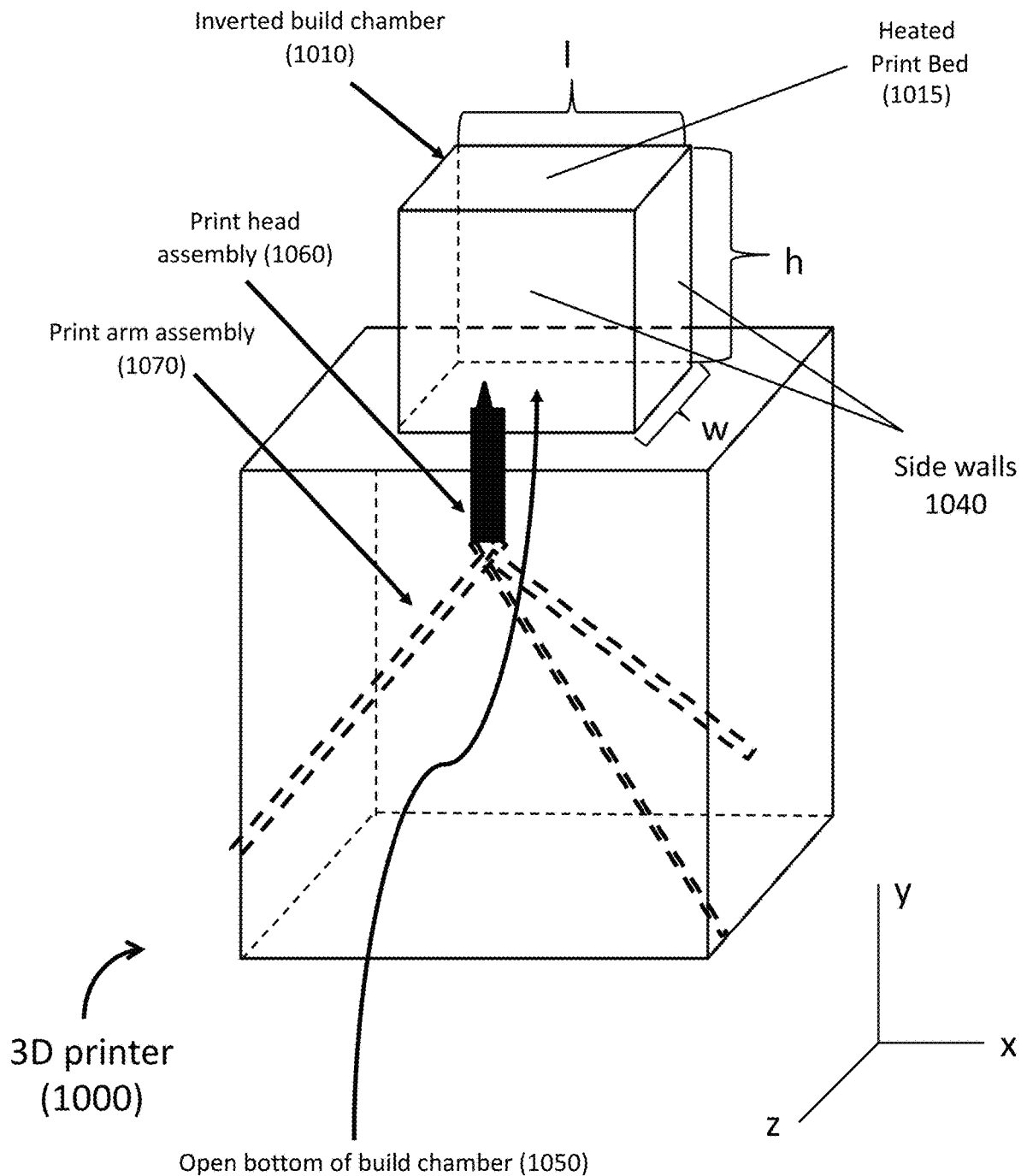
FIG. 12 shows an embodiment of a 3D printer containing an inverted build chamber configured to print high-performance materials as described herein.
Figure 13:
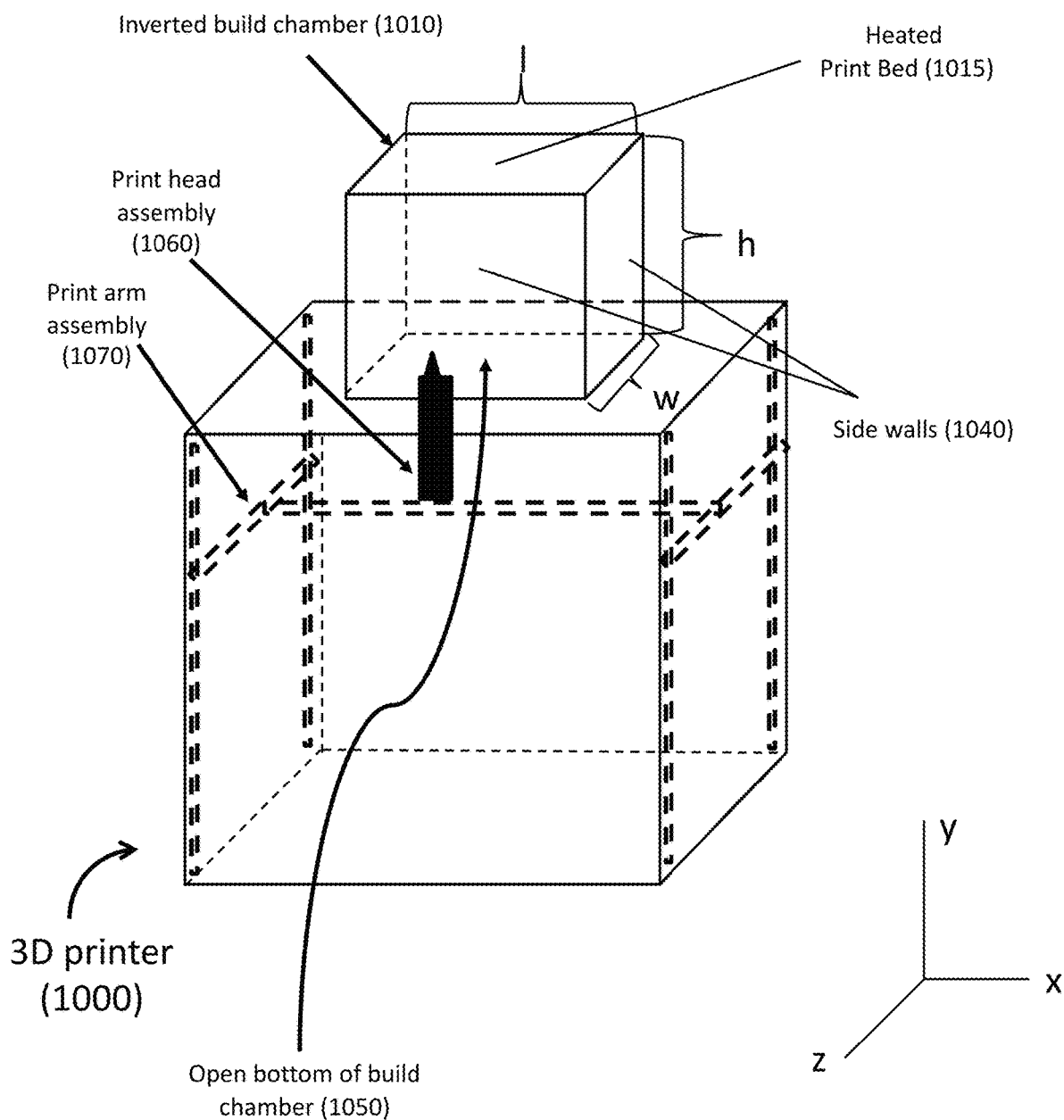
FIG. 13 shows an embodiment of a 3D printer containing an inverted build chamber configured to print high-performance materials as described herein.
Figure 14:
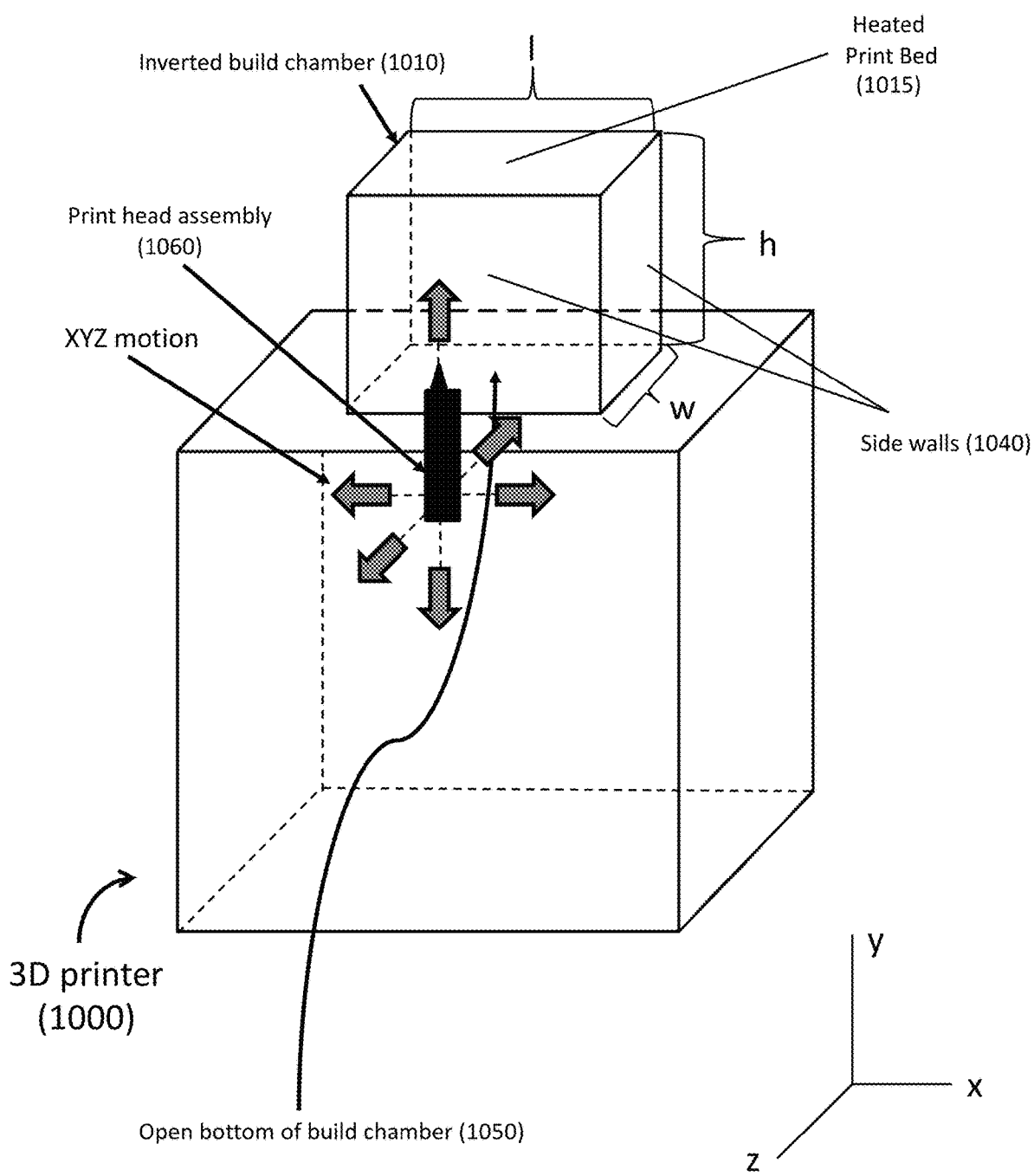
FIG. 14 shows an embodiment of a 3D printer containing an inverted build chamber configured to print high-performance materials as described herein.

The build chamber 1010 can be any suitable 3D shape including, but not limited to, a rectangular prism (which includes a cube) and a cylinder. As shown in FIGS. 12-14, the inverted build chamber 1010 can be a rectangular prism that can have a height, a length, and a width. Generally, the configuration described herein is scalable to any desired size. The ranges provided here are exemplary and others beyond those explicitly discussed herein are within the scope of this disclosure based on the scalability of the design. The height can range from 12 inches to 36 inches. The length can range from 12 inches to 36 inches. The width can range from 12 inches to 36 inches. The inverted build chamber 1010 can be a cylinder that can have a height and a diameter. The height can range from 12 inches to 36 inches. The diameter can range from 12 inches to 36 inches.

As discussed above, the configuration of the inverted build chamber 1010 and its inverted position within the 3D printer 1000 can generate a continuous temperature within the inverted build chamber 1000 that allows, unlike currently available 3D printers, the environmental temperature at the region at and right below the print surface (also referred to herein as the print region) to reach and be constantly maintained at about 200° C. or greater. The configuration of the inverted build chamber 1010 and its inverted position within the 3D printer 1000 can allow for a substantially homogenous temperature across the entire print surface and substantially homogenous environmental temperature within the print region. In some embodiments, the inverted build chamber 1010 can be configured to generate a homogeneous temperature within the inverted build chamber 1010 during operation such that the environmental temperature of the print region is maintained at about the temperature that the insulated sidewalls 1040 and bed 1015 are heated to. The inverted build chamber 1010 can be configured to maintain the environmental temperature of the print region at about 200° C. or greater. In some aspects, the insulated side walls 1040 can be capable of and/or configured to be heated to about 25° C. to 500° C. or greater. In some aspects, the insulated side walls 1040 can be capable of and/or configured to be heated at a temperature of at least 200° C. In some aspects, the insulated side walls 1040 can be capable of and/or configured to be heated at a temperature ranging from at least 200° C. to about 500° C. or greater.

In some aspects, the insulated side walls 1040 can be capable of and/or configured to be heated up to a temperature ranging from about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater. In some aspects the insulated side walls 1040 can be capable of and/or configured to be heated up to a temperature of about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C.

In some embodiments, the insulated side walls 1040 can be capable of and/or configured to be heated up to a temperature ranging from at least 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater. In some aspects, the insulated side walls 1040 can be capable of and/or configured to be heated up to about 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

In some embodiments, the inverted build chamber 1010 can be capable of and/or configured to maintain the environmental temperature of the print region at the print surface of the insulated heated print bed 1015 at a temperature ranging from about 25° C. to about 500° C. or greater. In some embodiments, the inverted build chamber 1010 can be capable of and/or configured to maintain the environmental temperature of the print region at the print surface of the insulated heated print bed 1015 at a temperature ranging from about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater.

In some embodiments, the inverted build chamber 1010 can be capable of and/or configured to maintain the environmental temperature of the print region at the print surface of the insulated heated print bed at a temperature of about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

In some embodiments, the inverted build chamber 1010 can be capable of and/or configured to maintain the environmental temperature of the print region at the print surface of the insulated heated print bed 1015 at a temperature ranging from 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater. In some aspects, inverted build chamber 1010 can be capable of and/or configured to maintain the environmental temperature of the print region at the print surface of the insulated heated print bed 1015 at a temperature of about 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

The print region can extend to the z height of the print area minus 1 inch, where the 1 inch boundary is still at an elevated temperature but is not necessarily a homogenous temperature.

With embodiments of the 3D printer capable of printing high-performance materials in mind, the discussion continues with methods of operation of the 3D printers described herein. Generally, the 3D printers described herein 1000 operate under the principles of fused filament fabrication. Generally, a filament of material is fed through and melted by the extruder 1020 and deposited layer-by-layers on the surface of the print bed 1015 to form a 3D object. Depending on the configuration, the 3D printers described herein 1000 can have a movable print bed 1015 and a movable or fixed print arm assembly 1070 or a fixed print bed 1015 with a movable print arm assembly 1070. The 3D printer described herein is not limited by the specific configuration of the print bed or printer assembly 1070/1060 except that in operation the print bed must be maintained at as the top wall of the inverted build chamber 1010 and that deposition of material (e.g. printing) must occur within the inverted build chamber 1010 at least when using the 3D printer described herein 1000 to print with high-performance materials.

During operation, the 3D printer described herein 1000 can be capable of printing at a temperature of 200° C. or greater. In some embodiments, the 3D printer described herein can print at about 200° C. to about 225, 250, 275, 300, 325, 350, 375, 400, 425, 450, 475, 500° C. or greater. Other temperatures and ranges are discussed elsewhere herein. In some aspects, the 3D printer described herein can be capable of and/or configured to print at a temperature ranging of about 25° C. to about 500° C. or greater. In some aspects, one or more areas within the inverted build chamber 1010 can reach and be maintained at about 200° C. to about 225, 250, 275, 300, 325, 350, 375, 400, 425, 450, 475, 500° C. or greater. Other temperatures and ranges are discussed elsewhere herein. In some embodiments, the area within the inverted build chamber 1010 that can reach and can be maintained at about 200° C. to about 225, 250, 275, 300, 325, 350, 375, 400, 425, 450, 475, 500° C. or greater is the print region. Other temperatures and ranges are discussed elsewhere herein. In some embodiments, the 3D printer described herein 1000 can be operated (e.g. print) at temperatures ranging from about ambient temperature to 500° C. or any value or range of values therein.

In some aspects, the 3D printer described herein 1000 can be capable of printing at a temperature ranging from about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

In some aspects, the 3D printer described herein 1000 can be capable of printing at about 25° C., 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

During use, the insulated side walls 1040 of the inverted build chamber 1010 can be heated to a temperature suitable for melting and depositing the filament material on the print bed surface or another layer already deposited. Where the filament material is a high performance material, the insulated side walls 1040 can be heated to 200° C. or greater. In some embodiments, such as those where the filament material is a high-performance material, the insulated side walls 1040 can be heated to a temperature ranging from about 200° C. to about 500° C. or greater. In some embodiments, such as those where the filament material is a high-performance material, the insulated side walls 1040 can be heated to a temperature ranging from about 200° C. to about 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, to about 500° C. or greater. In some embodiments, such as those where the filament material is a high-performance material, the insulated side walls 1040 can be heated to a temperature of about 200° C., 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, or about 500° C.

As previously described, the heat from the side walls 1040 can create a temperature gradient and convection flow within the inverted build chamber 1010 that can allow the environmental temperature of the print region reaches about 200° C. or greater (e.g. a temperature of about 200° C. to about 500° C. or greater (and any range or value therein)) and allow it to be substantially homogenous across the print surface and within the print region. Further, the convection flow can produce a temperature boundary at the open bottom of the inverted build chamber 1010 that keeps cool air from outside of the inverted build chamber 1010 from entering the inverted build chamber 1010 and hot air within the inverted build chamber 1010.

After the 3D object or a portion thereof is printed, the 3D object or portion thereof can be allowed to cool and the layers to anneal and/or cure. In some embodiments, the rate of cooling can be controlled or uncontrolled. Where the rate is uncontrolled, cooling be accomplished by e.g., simply turning off one or more of the heating elements within the 3D printer, opening one or more walls of the inverted build chamber, and/or removing the 3D printed object from the build chamber, and allowing the 3D object or portion thereof come to ambient temperature as the build chamber cools without any specific control of the rate of cooling. In some embodiments, the rate of cooling can be controlled. In some embodiments, the heaters can be programmed to automatically reduce heating of the inverted build chamber at a pre-defined rate by the user. In some embodiments, the 3D printer can include a cooling assembly coupled to the inverted build chamber configured to allow control of the rate cooling of the environment, and thus the 3D printed object and portion thereof, within the inverted build chamber. The 3D printer can be configured such that the control of operation of the cooling assembly be automatic based on a pre-defined program set by a user. In some embodiments, the inverted build chamber can have a bottom lid that is configured to automatically removably cover the open bottom that is open during printing and can automatically close after printing of the 3D object or portion thereof is complete. The bottom lid can be configured to open partially or completely after printing to control the rate of cooling during the annealing process. The 3D printer can be configured such that the control of operation of the bottom lid can be automatic based on a pre-defined program set by a user. A desired annealing rate can be based on, among other things, the material being printed and the desired properties of the 3D printed object or portion thereof, which will be appreciated by one of ordinary skill in the art in view of the description herein without undue experimentation.

In some embodiments, the annealing rate can be controlled by controlling the rate of cooling. In some aspects, the temperature decreased by 0.1° C. to 10° C. per second, minute, or hour. In some aspects, the temperature can be decreased at about 0.1° C., 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or about 10° C. per second, minute, or hour.

Controlling to rate of cooling and thus the annealing rate can, in some aspects, alter the crystal structure of the high-performance material being printed. Thus, the properties of the 3D printed article can be altered by altering the rate of cooling.

After printing, the 3D object can be removed from the print surface using any suitable detachment method, which are generally known in the art.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1. Verification Via Computational Modeling

The inverted system concept was first modeled using a computational fluid dynamics (CFD) model to verify that a high-temperature environment could be reached and sustained, and that a temperature barrier would be created. The system was modeled using Ansys 17.0 Fluent. A 2D steady state, pressure-based model was used, with a coupled pseudo transient solution method. A small chamber was created of 2 in.×6 in. to match the dimensions of the prototype (Example 2 herein). The walls were modeled as a ¼ in. thick aluminum plate at a constant temperature. An open atmosphere around the opening of the chamber (12 in.×12 in.) was defined to simulate the temperature where electronic components reside. Fluent does not have an open boundary condition, therefore an intake-fan was used to model the open boundary, with turbulence intensity of 5% and a turbulence viscosity ratio of 10. The sensitivity of the turbulence and other fluent boundary conditions were modeled to verify the assumed boundary condition did not significantly affect the temperature gradient or velocity profile within the chamber. The density, specific heat capacity, thermal conductivity, and viscosity of air were manually input as a piece-wise linear function of temperature. Sensitivity analysis was done on the mesh and boundary conditions to ensure the accuracy of the model.

Figure 4A:
FIGS. 4A-4C show the simulation output for the (FIG. 4A) the experimental set up, (FIG. 4B) temperature profile, and (FIG. 4c) the velocity profile for the inverted heat chamber. The units for the scale are measured in Kelvin for the temperature profile and m/s for the velocity profile.
Figure 4B:
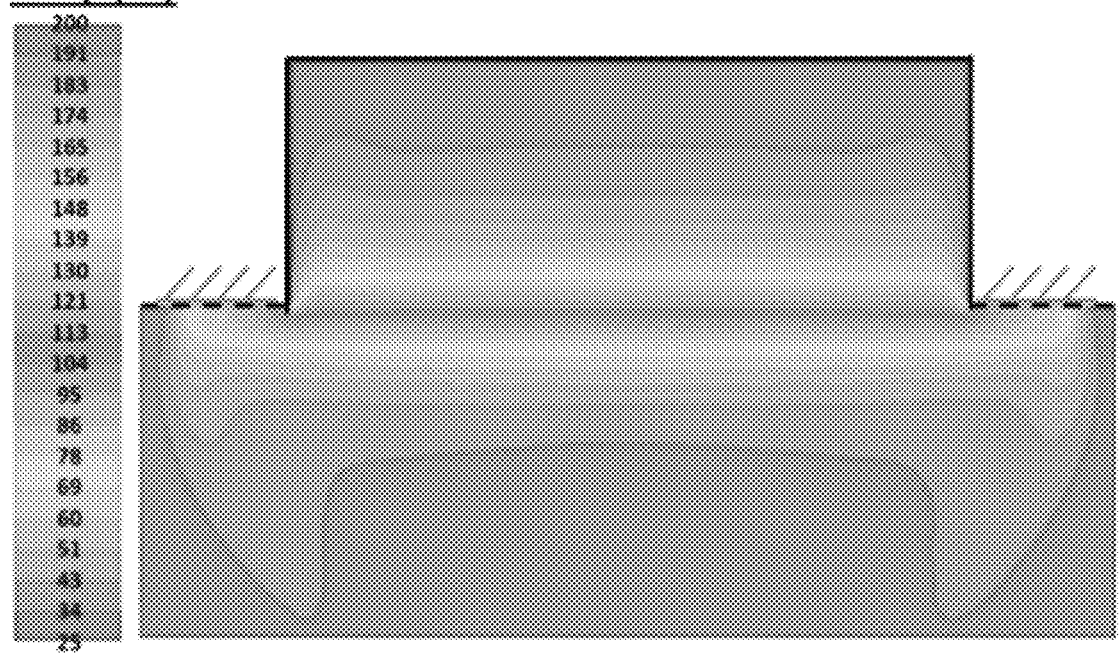
Figure 4C:
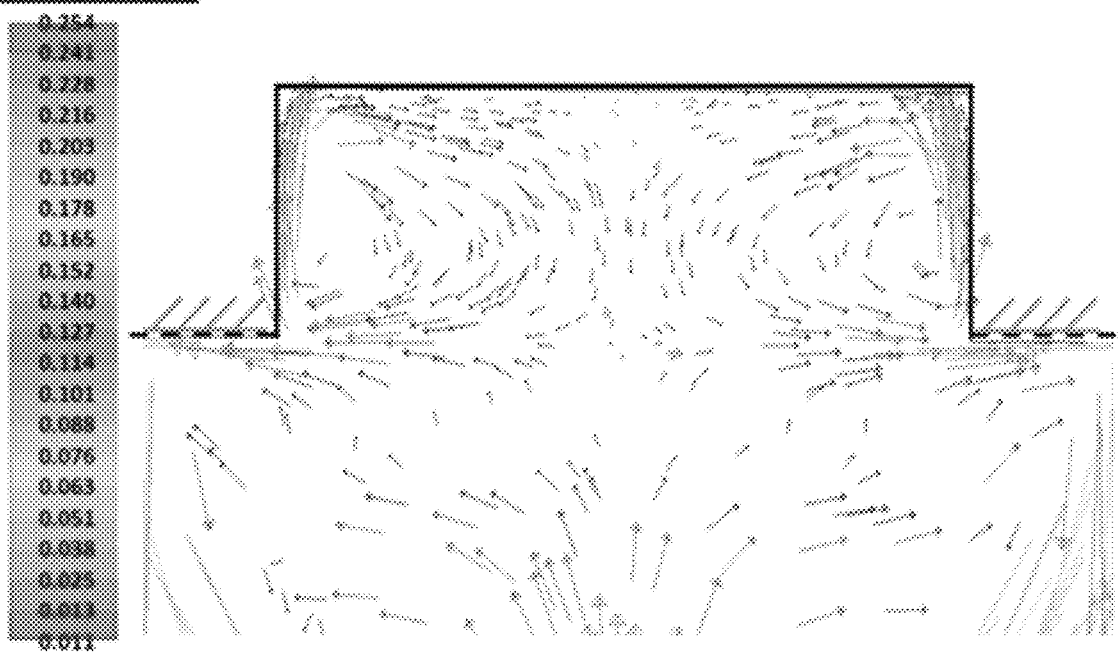

The resulting thermal map and velocity profile are shown in FIGS. 4A-4C, with the temperature of the chamber walls set to 200° C. Trapped hot air rises to the top of the chamber forming a temperature gradient at the boundary of the chamber. Heat generating from both the walls and the print bed create a vertical temperature profile with horizontal temperature boundary and even environment heating. Air heated by the walls causes the air to flow upward along the wall, through natural convection. The vertical flow on the walls of the chamber then pushes the air on the top of the chamber to then flow inward and down creating a circular flow. Warm air recirculates as it nears the temperature boundary due to the lower density warm air remaining above the cool air to effectively enclose the warm air in the chamber.

Figure 5:
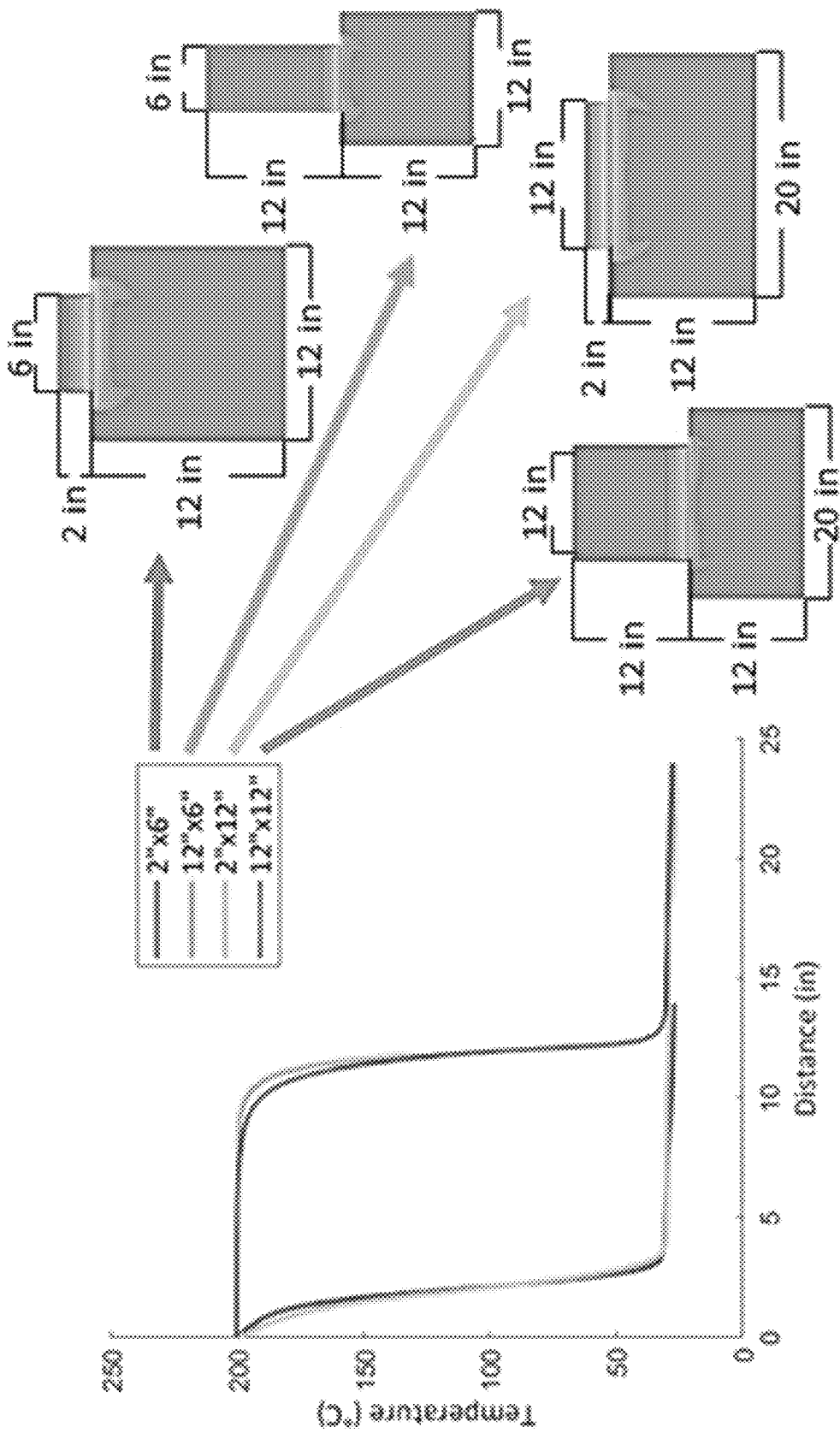
FIG. 5 can show the temperature profile of different sized heat chamber using a 2D Fluent model.

To verify that the design is generalizable for larger dimensions, the simulation was run with different size chambers comparing the (1) 2"×6" chamber to a (2) taller (12"×6"), (3) wider (2"×12"), and (4) taller and wider (12"×12") chamber. FIG. 5 can demonstrate that increasing the chamber depth results in the temperature gradient remaining at the boundary of the heated chamber. The chamber width does not significantly affect the temperature gradient boundary. Increasing the size of the chamber becomes physically challenging to build and produce an isothermal wall boundary condition, however a smaller isothermal wall for desktop scale systems is trivial.

Example 2. Experimental Validation

The system was then prototyped and verified to match the model temperature profiles and parts were printed using PPSF to demonstrate the potential advantage of the system.
4.1 Method
4.1.1 Materials
The prototype for the 2"×6" heat chamber consisted of an aluminum shell surrounded by heating elements and insulation. The total cost of the materials for the high temperature upgrade for an existing delta-style printer was less than $300.

Off the shelf PPSF-PPSU (1.75 mm diameter) filament from Stratasys was used for printing trials. This material has a reported glass transition temperature of 230° C. and heat deflection temperature of 189° C. [30]. Stratasys operating manual states a maximum extrusion temperature of 415° C. and a maximum oven temperature of 225° C. [31].
4.1.2 Thermal Model Validation
The temperature of the chamber walls are controlled by 2 PID controllers to create an isothermal boundary. Measurements were taken after the temperatures stabilized. A K-type thermocouple was used to take measurements at different distances from the bed by suspending a thermocouple in air secured to a stainless steel ruler secured to the center of the bed. Measurements were taken at 1" increments from the print bed. All measurements were recorded as the average temperature over one minute.
4.1.3 Tensile Test
Small dog bones were printed on a PEI sheet that were secured to the printer bed using Kapton tape. The dog bones are 63.5 mm in length, 9.53 mm in width, and 3.17 mm in height, the center section is 3.17 mm in width. The infill was set to 95% density with 1 perimeter and a rectilinear infill at +45°/−45° ever other layer printing at 15 mm/s with a 0.2 mm layer height and were printed in the xy plane. The print parameters were not optimized for strength or accuracy. The high temperature environment was set to 200° C. and room temperature, and a 0.4 mm nozzle was set to 350° C. All of the parts were printed upside down on the same printer with the same print settings with the exception of environment temperature to compare the high environment temperature conditions to room temperature. Complete parts were immediately removed from the printer and set aside until the part cooled. Parts were then removed from the PEI sheet for tensile testing.

Figure 6:
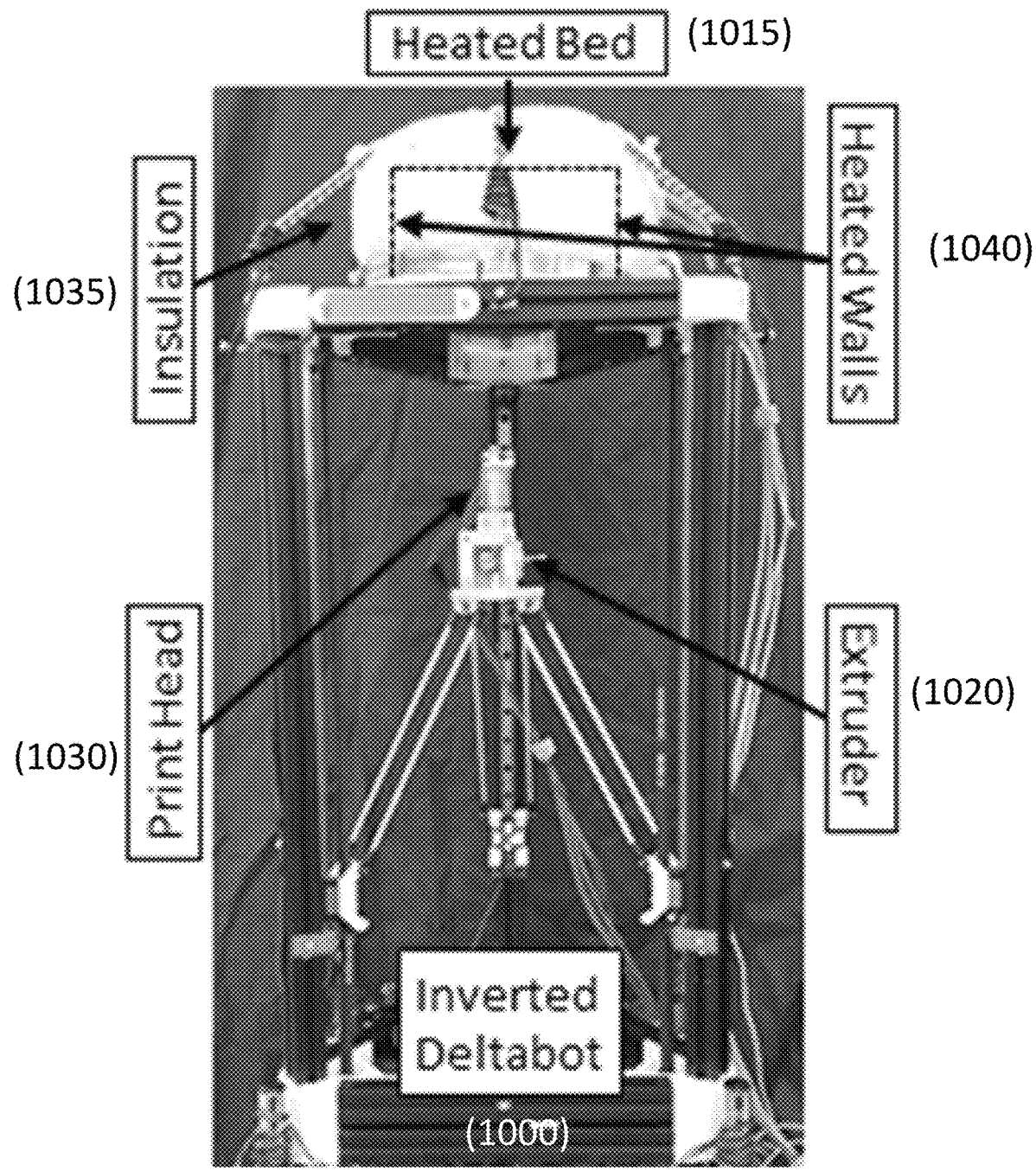
FIG. 6 shows a functional prototype of a 3D printer as described herein with the inverted heated build chamber that is capable of printing high-performance materials.

The tensile bars were pulled by an instron 5984 with a 10 kN load cell at 5 mm/min as per ASTM D638 [28]. The strain was calculated based on the distance of the grips. The elastic modulus was taken in the linear region where the linear fit had an R2 value of 0.99.
4.2 Results
The printer design was prototyped and tested using a custom delta robot 3D printer, as seen in FIG. 6, using an Arduino ATmega2560 running a custom version of marlin firmware. The heat chamber is at the top with thick insulation (about 1"), and 120V AC heaters used on both the bed and walls of the environment. The heat chamber temperatures were first measured via thermocouple to validate the temperature profile as a function of the distance from the bed. Then parts were printed using PPSF in the inverted high temperature environment.

4.2.1 Thermal Model Validation

Figure 7:
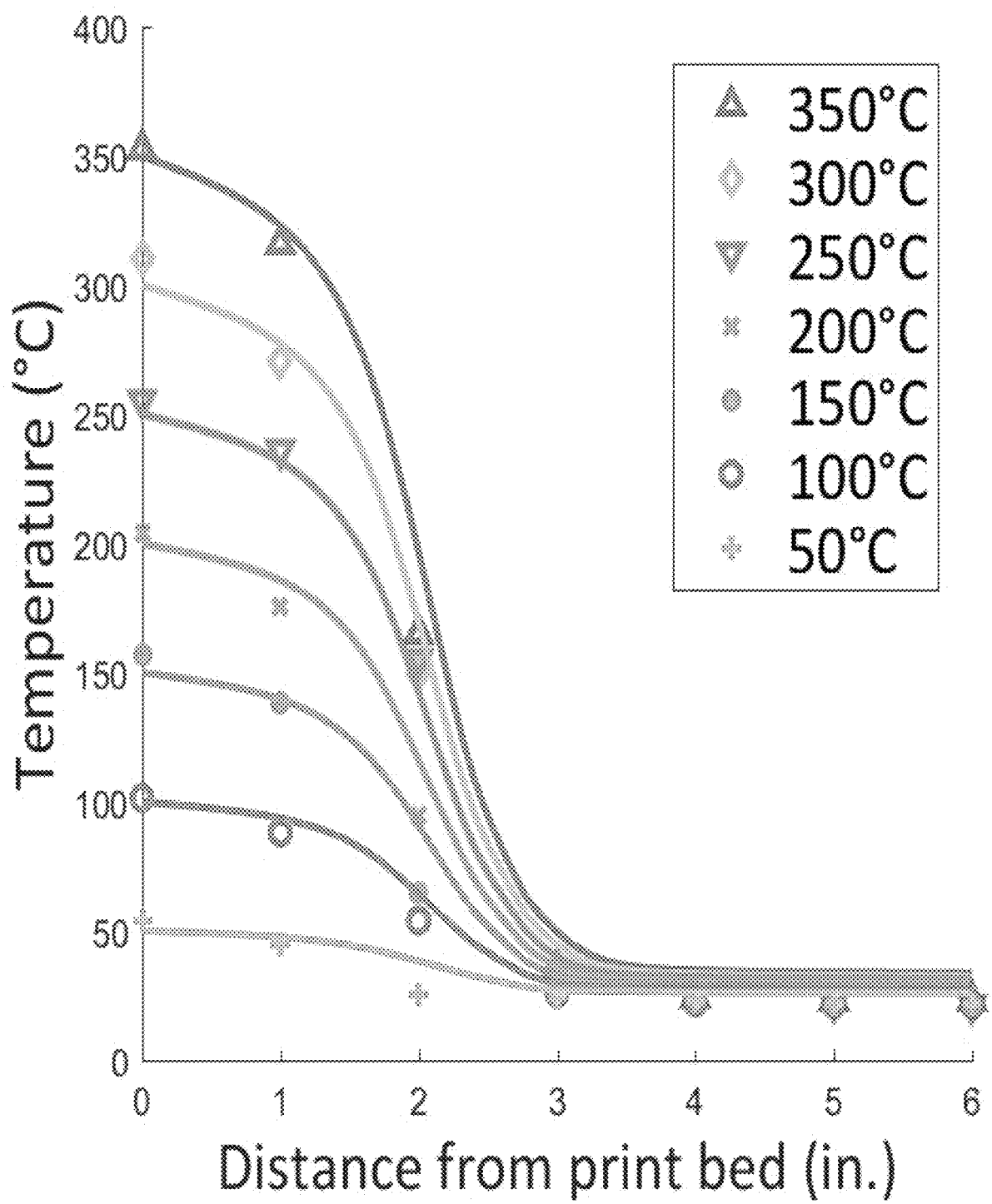
FIG. 7 shows a graph that can demonstrate experimental and modeled temperatures from the center of the bed outward where the chamber bed and walls were set to 50-350° C., in the inverted heat chamber. The markers represent the measured temperatures, while the line represents the temperature values from the simulation.

Measurements were taken at 1" increments from the print bed and compared to the CFD thermal model. FIG. 7 shows the profile for the experimental and modeled temperature in 50° C. increments from 50° C. to 350° C. using the inverted system. There is a large drop in temperature around 2", corresponding to the height of the chamber wall. This location experienced the highest variation in temperature while recording measurements caused by the mixing of cold and hot air induced by natural convection. The average temperature was used and was similar to the pseudo transient model. Other causes in the variation between the model and experiment include the accuracy of the distance from the bed is ±0.125" and the assumptions used for the models atmospheres boundary condition. The thermocouple reads consistently on either side of the thermal boundary.

The inverted heat chamber was successfully brought up to 400° C. The temperature measurements could not be taken at different distances from the bed, due to the loss in adhesion of the kapton tape to secure the steel ruler. At this temperature the PID controller was not at 100% output power to maintain the temperature. The design concept can allow for higher temperature, maximizing the environment build temperature through component selection of heaters, insulation, and environment mounts and not limited to the motion controlled parts and electronics, and plastic mounts, wires, and belts.

Figure 8:
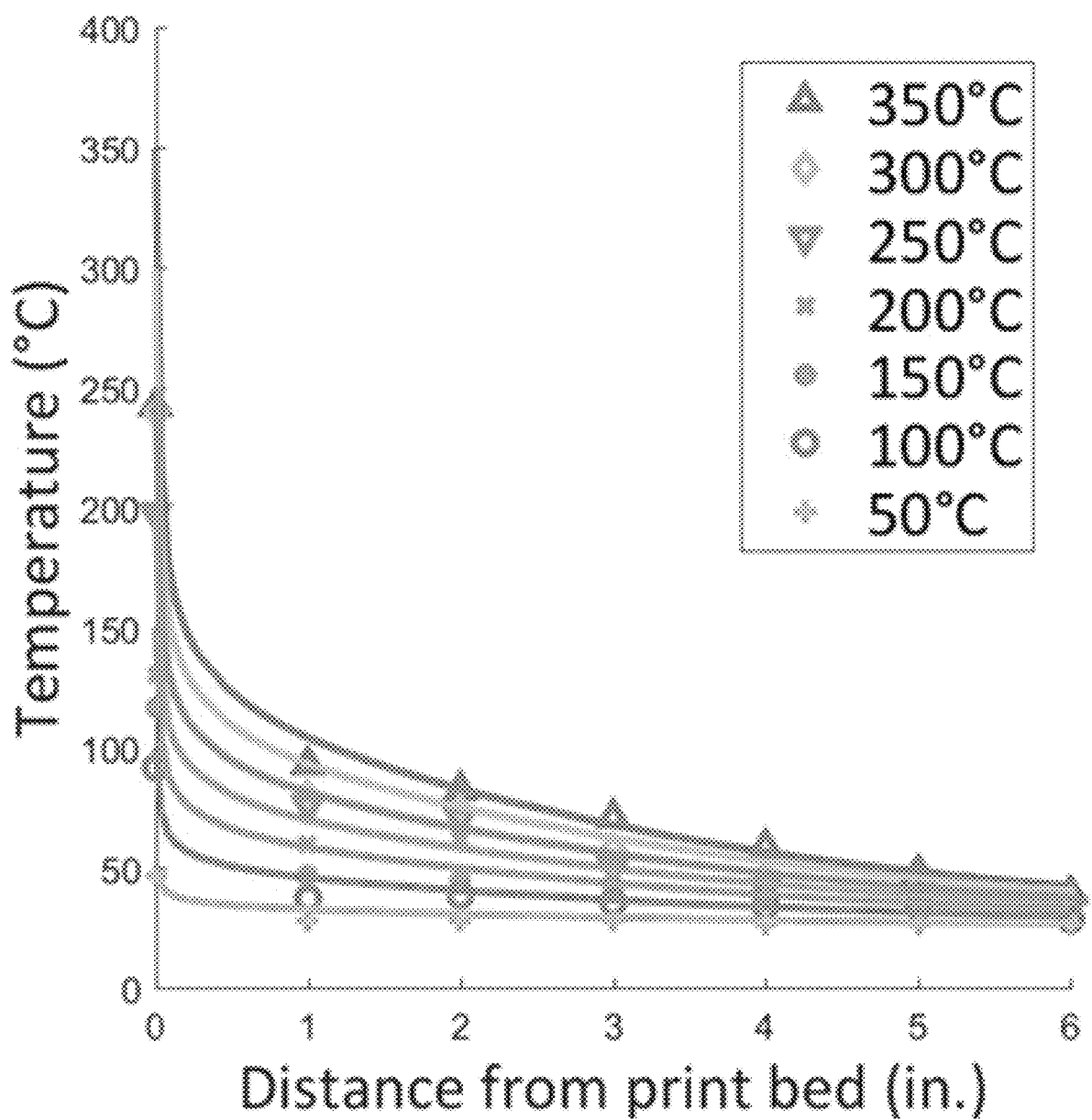
FIG. 8 shows a graph that can demonstrate measured temperatures at different displacements from the bed at temperature controller set temperatures are between about 50-350° C., with a non-inverted heat chamber. The markers represent the experimental data, while the line represents the simulated data.

To validate the design decision to invent the print chamber, the results are compared to traditional (non-inverted) chamber. An identical simulation was run with gravity inverted. The experimental data was collected with the chamber opening was facing upwards. FIG. 8 is a graph of the temperature profile for the non-inverted system. The traditional system chamber shows an exponential decay at increasing distances from the print bed. At high temperatures, the temperature on the print side of the bed could not fully reach the set temperature that was measured on the insulated side of the bed. Heat is lost quickly using an open top heat chamber. The inverted heat chamber shows an asymptotic curve up to the set temperature, while the traditional design shows exponential decay to the room temperature. The dramatic loss in heat would be minimized in this configuration if heated walls were not used, allowing heat to travel up through the center of the bed. However, at high temperatures a printer with a heated bed and no heated walls still results in high energy loss and inconsistent heating.

4.2.2 Demonstrating Printing

Parts were printed on the inverted heated system to demonstrate the capability of printing and increased mechanical performance due to the heated environment. An experiment was done to compare the heated environment parts to no heat on the inverted system, to explore the impact of the heated environment on part strength.

A sample of a printed tensile bar can be seen in FIG. 9. The temperature of the inverted heat chamber was set to room temperature (about 25° C.) and 200° C. respectively; however, the room temperature environment temperature did increase due to the heat from the print nozzle and the chamber insulation. The bed and wall thermocouples read as high as ~50° C. while printing the room temperature tensile bars.

The high temperature tensile bars did not curl where the room temperature did. The cool environment tensile specimens curled as much as 2.3 mm in the z direction, affecting the quality of the print, as well as the strength. The curling was so significant that one of the tensile bars fell off of the bed during the print, and the z-offset had to be adjusted to push the print head into the bed rather than being correctly calibrated. The 200° C. temperature prevents the materially from thermally shrinking during the print, but is below the glass transition temperature (230° C.) [29], so that the material is able to hold its shape. The authors believe the slight curvature in the zy plane of the 200° C. specimen, FIG. 9, was caused during the part removal process from the PEI sheet. Using the coefficient of thermal expansion given by Stratasys [29], the room temperature tensile bars are calculated to shrink up to 0.06 mm more each layer in length than the high temperature tensile bars, a total of 0.11 mm from the extruded temperature. The discrete shrinkage of the layers is what causes the residual stresses in the part to accumulate and cause the part to delaminate or curl. The material shrinks less while printing in the high-temperature environment, allowing the majority of the shrinking to occur after the part is printed and removed from the bed, where the part shrinks uniformly rather than discretely by layer.

The high temperature environment likely induces annealing within the part during the print. The high temperature environment increases the initial bonding potential as well as some annealing to create a stronger bond within and between layers. Giving the part time to sit in the high temperature environment c for chain entanglement between layers to improve the part strength.

Figure 10:
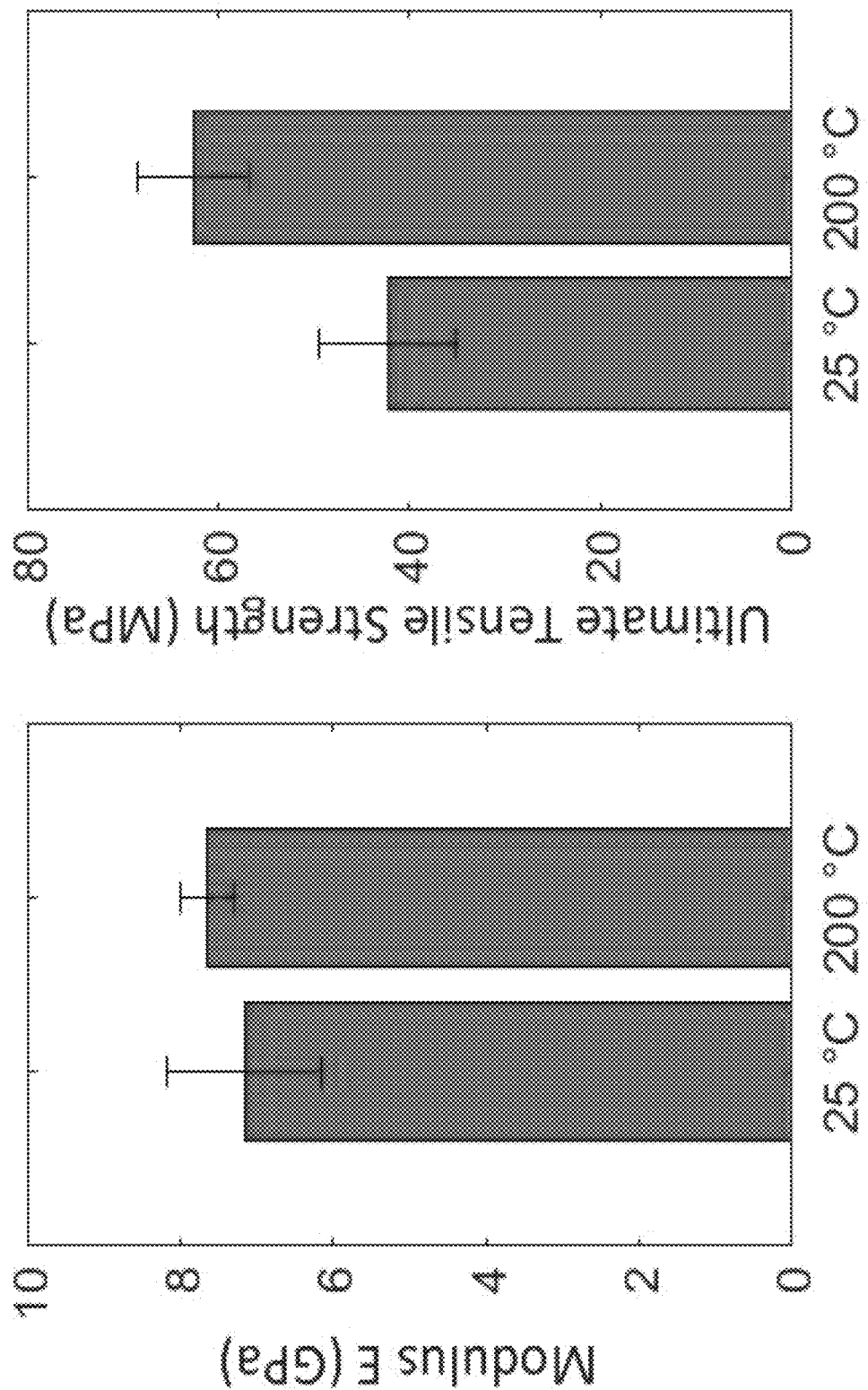
FIG. 10 shows graphs that can demonstrate the tensile results of four tensile bars at 25° C. and five tensile bars at 200° C. pulled on an instron 5984 with a 10 kN load cell at 5 mm/min.

FIG. 10 shows graphs that can demonstrate the compiled data, where the elastic modulus between the two temperatures is fairly similar and the ultimate tensile strength is 48% higher for the higher environment temperature parts. This shows the high-temperature build chamber presented in this paper, was able to produce an increase in part strength using the high temperature environment. The ultimate tensile strength for the high temperature environment was measured to be 62.62±5.89 MPa which is comparable to the Stratasys material data sheet for printing PPSF on the Fortus at 55 MPa [29]. The elastic modulus is not comparable to the Stratasys reported data, because the set up did not allow for measuring the true strain, therefore the strain measured for this paper was taken from the distance between the grips.

Figure 11:
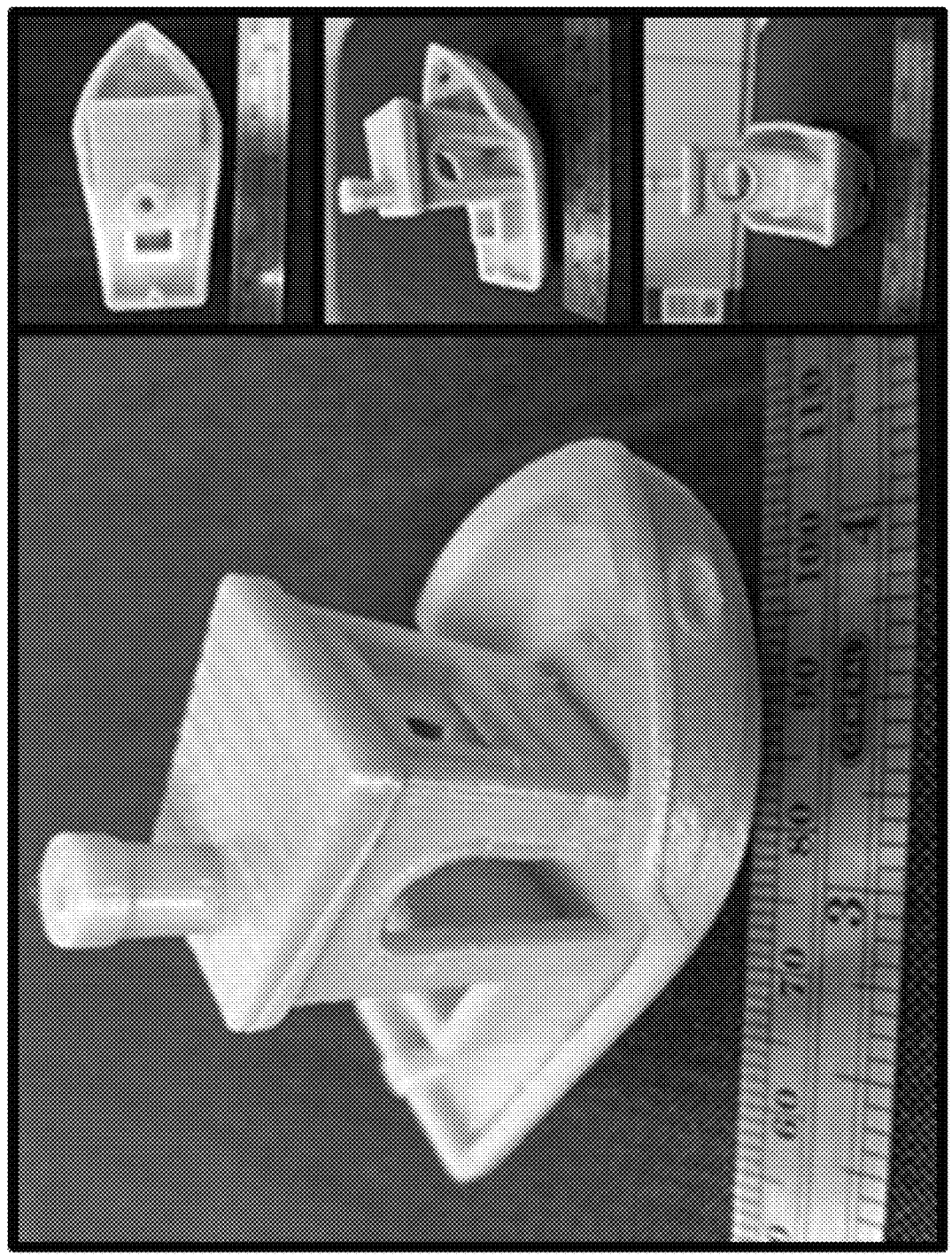
FIG. 11 shows an image of a standard part (3D Benchy) was printed to demonstrate the ability to print more complex parts in the inverted high temperature system. Part was printed at 15 mm/s using solid infill.

FIG. 11 shows a standard part (3D Benchy) that was printed using PPSF in the inverted high temperature system at the same process parameters as the high temperature tensile bars. 3D Benchy was designed as a standard part to test the ability to print features including vertical and horizontal cylindrical holes, curved and flat overhangs, and high resolution details [30]. All of the features were successfully printed with the exception of the tiny surface detail, the 0.1 mm extrusion "#3DBenchy" nameplate, on the back of the boat, which is a detail that is difficult for FFF systems. The same part gcode printed at room temperature failed early in printing the part, by curling and falling off of the inverted bed in the first few layers. This part demonstrated that the high temperature design enabled the printing of a complex structure.

REFERENCES FOR THIS EXAMPLE

[1] K. Szykiedans, W. Credo, and D. Osiński, "Selected Mechanical Properties of PETG 3-D Prints," Procedia Eng., vol. 177, pp. 455-461, 2017.

[2] S. R. G. Bates, I. R. Farrow, and R. S. Trask, "3D printed polyurethane honeycombs for repeated tailored energy absorption," Mater. Des., vol. 112, pp. 172-183, 2016.

[3] A. Goyanes, A. B. M. Buanz, A. W. Basit, and S. Gaisford, "Fused-filament 3D printing (3DP) for fabrication of tablets," Int. J. Pharm., vol. 476, no. 1, pp. 88-92, 2014.

[4] D. W. Hutmacher, T. Schantz, I. Zein, K. W. Ng, S. H. Teoh, and K. C. Tan, "Mechanical properties and cell cultural response of polycaprolactone scaffolds designed and fabricated via fused deposition modeling," J. Biomed. Mater. Res., vol. 55, no. 2, pp. 203-216, 2001.

[5] F. Ning, W. Cong, J. Qiu, J. Wei, and S. Wang, "Additive manufacturing of carbon fiber reinforced thermoplastic composites using fused deposition modeling," Compos. Part B Eng., vol. 80, pp. 369-378, 2015.

[6] S. J. Leigh, R. J. Bradley, C. P. Purssell, D. R. Billson, and D. A. Hutchins, "A Simple, Low-Cost Conductive Composite Material for 3D Printing of Electronic Sensors," PLoS One, vol. 7, no. 11, pp. 1-6, 2012.

[7] J. Gonzalez-Gutierrez, S. Cano, S. Schuschnigg, C. Kukla, J. Sapkota, and C. Holzer, "Additive manufacturing of metallic and ceramic components by the material extrusion of highly-filled polymers: A review and future perspectives," Materials (Basel)., vol. 11, no. 5, 2018.

[8] Y. Choi, C. Kim, H. Jeong, and J. Youn, "Influence of Bed Temperature on Heat Shrinkage Shape Error in FDM Additive Manufacturing of the ABS-Engineering Plastic," pp. 186-192, 2016.

[9] W. Swanson, P. Turley, P. Leavitt, P. Karwoski, J. LaBossiere, and R. Skubie, "High Temperaure Modeling Apparatus," U.S. Pat. No. 6,722,872 B1, 2004.

[10] C. Yang, X. Tian, D. Li, Y. Cao, F. Zhao, and C. Shi, "Influence of thermal processing conditions in 3D printing on the crystallinity and mechanical properties of PEEK material," J. Mater. Process. Technol., vol. 248, no. May, pp. 1-7, 2017.

[11] Y. Yan, R. Zhang, G. Hong, and X. Yuan, "Research on the bonding of material paths in melted extrusion modeling," Mater. Des., vol. 21, no. 2, pp. 93-99, 2000.

[12] B. N. Turner, R. Strong, and S. a. Gold, "A review of melt extrusion additive manufacturing processes: II. Materials, dimensional accuracy, and surface roughness," Rapid Prototyp. J., vol. 20, no. 3, pp. 192-204,2014.

[13] C. Duty, C. Ajinjeru, V. Kishore, B. Compton, N. Hmeidat, X. Chen, P. Liu, A. A. Hassen, J. Lindahl, and V. Kunc, "A viscoelastic model for evaluating extrusion-based print conditions," Solid Free. Fabr. Symp., pp. 495-506,2017.

[14] B. N. Turner, R. Strong, and S. a. Gold, "A review of melt extrusion additive manufacturing processes: I. Process design and modeling," Rapid Prototyp. J., vol. 20, no. 3, pp. 192-204,2014.

[15] L. Cherdo, "13 Professional PEEK 3D Printers (Also ULTEM®, PEI andd High-Performance Materials)," Aniwaa Pte. Ltd, 2018. [Online]. Available: www.aniwaa.com [16] Aon3D, "Aon3D AON-M2," aon3d Inc., 2018. [Online]. Available: www.aon3d.com.

[17] Apium, "Apium P220," Apium Additive Technologies GmbH, 2018.

[18] INTAMSYS, "INTAMSYS Funmat HT," INTAMSYS TECHNOLOGY CO. LTD., 2017. [Online]. Available: www.intamsys.com.

[19] Oo-kuma, "Oo-kuma Katana." [Online]. Available: www.00-kuma.com.

[20] Roboz, "Roboz One+400," Web agency BRAINPULL, 2018. [Online]. Available: www.roboze.com.

[21] Rokit, "Rokit 3Dison AEP," www.3disonprinter.com. [Online]. Available: en.3disonprinter.com.

[22] Stratasys, "Fortus 400mc," Stratasys Ltd., 2018. [Online]. Available: www.stratasys.com.

[23] Tractus3D, "Tractus3D T650P," Tractus3D, 2018. [Online]. Available: tractus3d.com.

[24] VeraShape VSHAPER Pro, "VSHAPER," VSHAPER, 2018. [Online]. Available: vshaper.com.

[25] H. Bheda and R. Reese, "Fused Filament Fabrication using liquid cooling," US2016/0271880 A1, 2016.

[26] J. M. Gardner, C. J. Stelter, E. A. Yashin, and E. J. Siochi, "High Temperature Thermoplastic Additive Manufacturing Using Low-Cost, Open-Source Hardware," no. October 2016, 2016.

[27] R. Crockett, D. Petersen, and K. Cooper, "Fused Deposition Modeling in microgravity," Solid Free. Fabr. Proceedings, August 1999, pp. 671-678, 1999.

[28] G. P. Radar, E. Resistivity, D. Forensic, R. Methods, and N. Ireland, "ASTM D638: Standard Test Method for Tensile Properties of Plastics." ASTM International, West Conshohocken, Pa., 2015.

[29] Stratasys, "PPSF Production-grade thermoplastic for fortus 3D Printers." Stratusys Inc., 2017.

[30] "3DBenchy," 2016. [Online]. Available: http://www.3dbenchy.com/. [Accessed: 31 Jul. 2018].

[31] F. Wulle, D. Coupek, F. Schaffner, A. Verl, F. Oberhofer, and T. Maier, "Workpiece and Machine Design in Additive Manufacturing for Multi-Axis Fused Deposition Modeling," Procedia CIRP, vol. 60, pp. 229-234, 2017.

We claim:

1. A three dimensional (3D) printer capable of printing at temperatures 200° C. or greater comprising:
   an inverted build chamber that is open on the bottom comprising:
     an insulated heated print bed comprising a print surface, wherein the insulated heated print bed is inverted such that the print surface is oriented towards the open bottom of the inverted build chamber and wherein the insulated heated print bed forms thea top wall of the inverted build chamber;
     one or more insulated side walls, wherein each of the insulated side walls is coupled to the insulated heated print bed and extend vertically away from the heated print bed, and
     wherein the one or more side walls are configured to enclose the heated print bed and are positioned such that the one or more side walls are perpendicular to the insulated heated print bed so as to form the inverted build chamber that is open on the bottom;
   a heater coupled to the inverted build chamber, wherein the heater is configured to heat insulated side walls to 200° C. or greater;
   a print head assembly comprising:
     an extruder configured to receive, heat, melt, and expel a filament, wherein the extruder comprises a nozzle through which a melted filament can be expelled, wherein the nozzle of the extruder is oriented upwards towards the print surface of the insulated heated print bead to expel and deposit the melted filament onto the print surface of the insulated heated print bed or onto a layer of material present on the print surface of the heated print bed; and
   a three-axis movement assembly coupled to the print head assembly, wherein the three-axis assembly is configured to move the print head assembly and is configured to maintain the print head assembly in a fixed position within the inverted build chamber or is configured to move the print head assembly in zero to three dimensions within the inverted build chamber and the build chamber is capable of moving in zero to three dimensions.

2. The 3D printer of claim 1, wherein the filament comprises a high-performance material.

3. The 3D printer of claim 1, wherein the filament comprises a polymer requiring a print environment temperature of greater than about 200° C.

4. The 3D printer of any one of claim 1, wherein the filament comprises a polymer selected from a group consisting of: PEEK, Ultem, and PPSF.

5. The 3D printer of any one of claim 1, wherein the inverted build chamber is a rectangular prism that can have a height, a length, and a width, wherein the height ranges from 12 inches to 36 inches, wherein the length ranges from 12 inches to 36 inches, and wherein the width ranges from 12 inches to 36 inches.

6. The 3D printer of any one of claim 1, wherein the inverted build chamber is a cylinder that can have a height and a diameter, wherein the height ranges from 12 inches to 36 inches and wherein the diameter ranges from 12 inches to 36 inches.

7. The 3D printer of claim 1, wherein the 3D printer further comprises a print arm assembly, wherein the print arm assembly is a delta configured print arm or a Cartesian configured printer assembly.

8. The 3D printer of claim 1, wherein the printer assembly comprises one or more robotic arms that have 3 or more degrees of freedom.

9. The 3D printer of claim 1, wherein the printer assembly is fixed and wherein the insulated heated print bed is configured to move in 3 dimensions and rotate in one or more planes within the inverted build chamber.

10. The 3D printer of claim 1, wherein the inverted build chamber is configured to generate a temperature gradient within the inverted build chamber during operation, wherein an environmental temperature of a print region at the print surface of the insulated heated print bed is maintained at about a temperature that the insulated sidewalls are heated to.

11. The 3D printer of claim 10, wherein inverted build chamber is configured to maintain the environmental temperature of the print region at the print surface of the insulated heated print bed at about 200° C. to about 500° C.

12. The 3D printer of claim 10, wherein the insulated side walls are configured to be heated to at least 200, 205, 210, 215, 220, 225, 230, 235, 240, 245, 250, 255, 260, 265, 270, 275, 280, 285, 290, 295, 300, 305, 310, 315, 320, 330, 335, 340, 345, 350, 355, 360, 365, 370, 375, 380, 385, 390, 395, 400, 405, 410, 415, 420, 425, 430, 435, 440, 445, 450 or 500° C.

13. The 3D printer of claim 10, wherein inverted build chamber is configured to maintain the environmental temperature of the print region at the print surface of the insulated heated print bed at about 200, 205, 210, 215, 220, 225, 230, 235, 240, 245, 250, 255, 260, 265, 270, 275, 280, 285, 290, 295, 300, 305, 310, 315, 320, 330, 335, 340, 345, 350, 355, 360, 365, 370, 375, 380, 385, 390, 395, 400, 405, 410, 415, 420, 425, 430, 435, 440, 445, 450 or 500° C.

14. The 3D printer of claim 10, wherein the print region at the print surface extends to a z height of the print area minus 1 inch.

15. A method of fused filament fabrication, the method comprising:
    heating the one or more insulated side walls of a 3D printer as in claim 1, to a temperature suitable for printing with a filament material contained within the extruder of the 3D printer;
    heating the print bed;
    heating one or more elements of the extruder to a temperature suitable for printing with a filament material contained within the extruder of the 3D printer; and
    printing a layer, the step of printing a layer comprising:
        melting a region of the filament material within the extruder;
        expelling the melted filament material through the nozzle of the extruder such that it is deposited on the print surface of the heated print bed or on a layer already present on the print surface.

16. The method of claim 15, wherein the insulated side walls are heated to a temperature of about 200° C. to about 500° C.

17. The method of claim 16, wherein the filament material is a high-performance material.

18. The method of claim 16, wherein the inverted build chamber is filled with a gas or gas mixture that is less dense than air at least during operation.

19. The method of claim 16, further comprising the step of annealing one or more layers of filament material deposited on the print surface.

20. The method of claim 16, wherein the step of annealing comprises controlling the cooling rate of one or more layers of filament material deposited on the print surface.

* * * * *